(12) United States Patent
Yahn et al.

(10) Patent No.: US 11,100,744 B2
(45) Date of Patent: Aug. 24, 2021

(54) MOBILE COMMERCE PLATFORMS AND ASSOCIATED SYSTEMS AND METHODS FOR CONVERTING CONSUMER COINS, CASH, AND/OR OTHER FORMS OF VALUE FOR USE WITH SAME

(71) Applicant: Coinstar Asset Holdings, LLC, Bellevue, WA (US)

(72) Inventors: Gregory Yahn, Renton, WA (US); Engle Saez, Seattle, WA (US)

(73) Assignee: Coinstar Asset Holdings, LLC, Bellevue, WA (US)

( * ) Notice: Subject to any disclaimer, the term of this patent is extended or adjusted under 35 U.S.C. 154(b) by 0 days.

(21) Appl. No.: 16/688,984

(22) Filed: Nov. 19, 2019

(65) Prior Publication Data
US 2020/0222193 A1   Jul. 16, 2020

Related U.S. Application Data

(63) Continuation of application No. 15/705,915, filed on Sep. 15, 2017, now Pat. No. 10,716,675, which is a
(Continued)

(51) Int. Cl.
*G07F 9/00* (2006.01)
*G06Q 30/02* (2012.01)
(Continued)

(52) U.S. Cl.
CPC ............ *G07F 9/001* (2020.05); *G06Q 20/10* (2013.01); *G06Q 20/20* (2013.01); *G06Q 20/322* (2013.01);
(Continued)

(58) Field of Classification Search
CPC .. G06Q 20/10; G06Q 20/322; G06Q 30/0237; G07F 9/08; G07F 9/001
See application file for complete search history.

(56) References Cited

U.S. PATENT DOCUMENTS

| 269,461 A | 12/1882 | Rakestraw |
| 446,303 A | 2/1891 | Thompson |
| (Continued) | | |

FOREIGN PATENT DOCUMENTS

| CA | 1053598 | 5/1979 |
| CA | 2060630 | 8/1992 |
| (Continued) | | |

OTHER PUBLICATIONS

"ACI Gift Cards, Inc. Launches Amazon Gift Codes on Demand," Sep. 5, 2008, available at http://www.reuters.com/article/2008/09/05/idus11420+05-sep-2008+bw2008905.
(Continued)

*Primary Examiner* — A. Hunter Wilder
(74) *Attorney, Agent, or Firm* — Perkins Coie LLP

(57) ABSTRACT

Systems and methods for converting consumer coins, cash, and/or other forms of value for use with mobile commerce platforms implemented on, for example, smart phones, PDAs, and other mobile devices. In one embodiment, a method for implementing a mobile commerce account on a mobile device includes receiving coins and/or other funds from a user at a consumer-operated kiosk. The method can further include counting the coins and/or other funds to determine a value, and then communicating at least a portion of the value from the kiosk to the hand-held mobile device for deposit in the mobile commerce account.

18 Claims, 17 Drawing Sheets

Related U.S. Application Data continuation of application No. 14/507,636, filed on Oct. 6, 2014, now Pat. No. 9,799,014, which is a continuation of application No. 13/304,254, filed on Nov. 23, 2011, now Pat. No. 8,874,467.

(51) Int. Cl.

| | | |
|---|---|---|
| *G07F 17/26* | (2006.01) | |
| *G07F 19/00* | (2006.01) | |
| *G06Q 20/32* | (2012.01) | |
| *G07F 9/08* | (2006.01) | |
| *G06Q 20/38* | (2012.01) | |
| *G06Q 20/10* | (2012.01) | |
| *G06Q 20/20* | (2012.01) | |
| *G07D 11/00* | (2019.01) | |

(52) U.S. Cl.
CPC ..... *G06Q 20/3223* (2013.01); *G06Q 20/3278* (2013.01); *G06Q 20/381* (2013.01); *G06Q 30/0237* (2013.01); *G07F 9/08* (2013.01); *G07F 17/26* (2013.01); *G07F 19/202* (2013.01); *G07D 11/00* (2013.01)

(56) References Cited

U.S. PATENT DOCUMENTS

| | | |
|---|---|---|
| 545,185 A | 8/1895 | Yost |
| 576,141 A | 2/1897 | Muenchinger |
| 1,010,993 A | 12/1911 | White |
| 1,234,707 A | 7/1917 | Whistler |
| 1,345,858 A | 7/1920 | Jenkins |
| 1,711,049 A | 4/1929 | Fonda et al. |
| 1,813,296 A | 7/1931 | Kidwell |
| 1,847,940 A | 3/1932 | Giles |
| 1,945,948 A | 2/1934 | Morin |
| 2,014,505 A | 9/1935 | Patche |
| 2,317,351 A | 4/1943 | Andalikiewicz et al. |
| 2,461,314 A | 2/1949 | Davis et al. |
| 2,569,360 A | 9/1951 | Weingart |
| 2,644,470 A | 7/1953 | Labbe |
| 2,865,561 A | 12/1958 | Rosapepe |
| 2,881,774 A | 4/1959 | Labbe |
| 2,960,377 A | 1/1960 | Simjian |
| 3,009,555 A | 11/1961 | Seckula, Sr. |
| 3,048,251 A | 8/1962 | Bower |
| 3,056,132 A | 9/1962 | Simjian |
| 3,065,467 A | 11/1962 | Prevost |
| 3,132,654 A | 5/1964 | Adams |
| 3,173,742 A | 3/1965 | Simjian |
| 3,196,257 A | 7/1965 | Buchholtz et al. |
| 3,227,363 A | 1/1966 | Hecker et al. |
| 3,286,805 A | 11/1966 | New |
| 3,396,737 A | 8/1968 | Picollo |
| 3,415,348 A | 12/1968 | Wahlberg |
| 3,599,771 A | 8/1971 | Hinterstocker |
| 3,603,327 A | 9/1971 | Buchholz et al. |
| 3,709,145 A | 1/1973 | Williamson |
| 3,763,871 A | 10/1973 | Jobst |
| 3,788,440 A | 1/1974 | Propice et al. |
| 3,791,574 A | 2/1974 | Picquot |
| 3,815,717 A | 6/1974 | Arseneau |
| 3,941,226 A | 3/1976 | Drakes |
| 3,960,293 A | 6/1976 | Sweet, II et al. |
| 3,969,584 A | 7/1976 | Miller et al. |
| 3,982,620 A | 9/1976 | Kortenhaus |
| 3,984,660 A | 10/1976 | Oka et al. |
| 3,998,237 A | 12/1976 | Kressin et al. |
| 4,014,424 A | 3/1977 | Hall |
| 4,036,242 A | 7/1977 | Breitenstein et al. |
| 4,058,954 A | 11/1977 | Asami |
| 4,059,122 A | 11/1977 | Kinoshita |
| 4,092,990 A | 6/1978 | Bayne |
| 4,099,722 A | 7/1978 | Rodesch et al. |
| 4,100,925 A | 7/1978 | Fukunaga |
| 4,106,610 A | 8/1978 | Heiman |
| 4,124,109 A | 11/1978 | Bissell et al. |
| 4,141,372 A | 2/1979 | Gdanski |
| 4,167,949 A | 9/1979 | Hashimoto et al. |
| 4,172,462 A | 10/1979 | Uchida et al. |
| 4,225,056 A | 9/1980 | Flubacker |
| 4,228,811 A | 10/1980 | Tanaka et al. |
| 4,230,213 A | 10/1980 | Spring |
| 4,249,552 A | 2/1981 | Margolin |
| 4,264,282 A | 4/1981 | Crago |
| 4,266,121 A | 5/1981 | Hirose |
| 4,275,751 A | 6/1981 | Bergman |
| 4,306,644 A | 12/1981 | Rockola et al. |
| 4,321,672 A | 3/1982 | Braun et al. |
| 4,326,620 A | 4/1982 | Felix et al. |
| 4,346,798 A | 8/1982 | Agey, III |
| 4,356,829 A | 11/1982 | Furuya |
| 4,360,034 A | 11/1982 | Davila et al. |
| 4,369,442 A | 1/1983 | Werth et al. |
| 4,369,800 A | 1/1983 | Watanabe et al. |
| 4,374,557 A | 2/1983 | Sugimoto et al. |
| 4,376,442 A | 3/1983 | Gomez et al. |
| 4,380,316 A | 4/1983 | Glinka et al. |
| 4,383,540 A | 5/1983 | De Meyer et al. |
| 4,398,550 A | 8/1983 | Shireman |
| 4,412,292 A | 10/1983 | Sedam et al. |
| 4,412,607 A | 11/1983 | Collins et al. |
| 4,434,359 A | 2/1984 | Watanabe |
| 4,436,103 A | 3/1984 | Dick |
| 4,442,850 A | 4/1984 | Austin et al. |
| 4,447,714 A | 5/1984 | Lundblad et al. |
| 4,503,963 A | 3/1985 | Steiner |
| 4,504,357 A | 3/1985 | Holbein et al. |
| 4,506,685 A | 3/1985 | Childers et al. |
| 4,509,122 A | 4/1985 | Agnew et al. |
| 4,509,633 A | 4/1985 | Chow |
| 4,542,817 A | 9/1985 | Paulson |
| 4,543,969 A | 10/1985 | Rasmussen |
| 4,554,446 A | 11/1985 | Murphy et al. |
| 4,555,618 A | 11/1985 | Riskin |
| 4,558,711 A | 12/1985 | Ikuta Yoshiaki et al. |
| 4,577,744 A | 3/1986 | Doucet et al. |
| 4,587,984 A | 5/1986 | Levasseur et al. |
| 4,597,487 A | 7/1986 | Crosby et al. |
| 4,598,378 A | 7/1986 | Giacomo |
| 4,611,205 A | 9/1986 | Eglise et al. |
| 4,616,323 A | 10/1986 | Hayashi |
| 4,616,776 A | 10/1986 | Blumenthal et al. |
| 4,620,559 A | 11/1986 | Childers |
| 4,622,456 A | 11/1986 | Naruto et al. |
| 4,641,239 A | 2/1987 | Takesako |
| 4,672,377 A | 6/1987 | Murphy et al. |
| 4,674,055 A | 6/1987 | Ogaki et al. |
| 4,677,565 A | 6/1987 | Ogaki et al. |
| 4,694,845 A | 9/1987 | Zay |
| 4,706,577 A | 11/1987 | Jones |
| 4,706,795 A | 11/1987 | Mikami et al. |
| 4,716,799 A | 1/1988 | Hartmann |
| 4,723,212 A | 2/1988 | Mindrum et al. |
| 4,733,765 A | 3/1988 | Watanabe |
| 4,753,625 A | 6/1988 | Okada |
| 4,767,917 A | 8/1988 | Ushikuba |
| 4,775,353 A | 10/1988 | Childers et al. |
| 4,775,354 A | 10/1988 | Rasmussen et al. |
| 4,809,837 A | 3/1989 | Hayashi et al. |
| 4,814,589 A | 3/1989 | Storch et al. |
| 4,817,043 A | 3/1989 | Brown |
| 4,831,374 A | 5/1989 | Masel |
| 4,833,308 A | 5/1989 | Humble |
| 4,882,675 A | 11/1989 | Nichtberger et al. |
| 4,883,158 A | 11/1989 | Kobayashi et al. |
| 4,884,672 A | 12/1989 | Parker |
| 4,896,791 A | 1/1990 | Smith |
| 4,898,564 A | 2/1990 | Gunn et al. |
| 4,910,672 A | 3/1990 | Off et al. |
| 4,915,205 A | 4/1990 | Reid et al. |
| 4,921,463 A | 5/1990 | Primdahl et al. |
| 4,936,436 A | 6/1990 | Keltner |
| 4,953,086 A | 8/1990 | Fukatsu |

(56) References Cited

U.S. PATENT DOCUMENTS

| | | |
|---|---|---|
| 4,959,624 A | 9/1990 | Higgins, Jr. et al. |
| 4,963,118 A | 10/1990 | Gunn et al. |
| 4,964,495 A | 10/1990 | Rasmussen |
| 4,969,549 A | 11/1990 | Eglise |
| 4,977,502 A | 12/1990 | Baker et al. |
| 4,978,322 A | 12/1990 | Paulsen |
| 4,995,848 A | 2/1991 | Goh |
| 4,997,406 A | 3/1991 | Horiguchi et al. |
| 5,010,238 A | 4/1991 | Kadono et al. |
| 5,021,967 A | 6/1991 | Smith |
| 5,022,889 A | 6/1991 | Ristvedt et al. |
| 5,025,139 A | 6/1991 | Halliburton, Jr. |
| 5,027,937 A | 7/1991 | Parish et al. |
| 5,039,848 A | 8/1991 | Stoken |
| 5,040,657 A | 8/1991 | Gunn et al. |
| 5,055,657 A | 10/1991 | Miller et al. |
| 5,056,644 A | 10/1991 | Parker |
| 5,073,767 A | 12/1991 | Holmes et al. |
| 5,083,765 A | 1/1992 | Kringel |
| 5,083,814 A | 1/1992 | Gulnta et al. |
| 5,088,587 A | 2/1992 | Goodrich et al. |
| 5,091,713 A | 2/1992 | Horne et al. |
| 5,098,339 A | 3/1992 | Dabrowski |
| 5,098,340 A | 3/1992 | Abe |
| 5,100,367 A | 3/1992 | Abe |
| 5,111,927 A | 5/1992 | Schulze, Jr. |
| 5,114,381 A | 5/1992 | Ueda et al. |
| 5,135,433 A | 8/1992 | Watanabe et al. |
| 5,163,868 A | 11/1992 | Adams et al. |
| 5,173,851 A | 12/1992 | Off et al. |
| 5,174,608 A | 12/1992 | Benardelli |
| 5,183,142 A | 2/1993 | Latchinian et al. |
| 5,195,626 A | 3/1993 | Le Hong et al. |
| 5,197,588 A | 3/1993 | Furuya et al. |
| 5,201,396 A | 4/1993 | Chalabian et al. |
| 5,219,059 A | 6/1993 | Furuya et al. |
| 5,226,519 A | 7/1993 | DeWoolfson |
| 5,227,874 A | 7/1993 | Von Kohorn |
| 5,227,966 A | 7/1993 | Ichiba |
| 5,236,339 A | 8/1993 | Nishiumi et al. |
| 5,251,738 A | 10/1993 | Dabrowski |
| 5,252,811 A | 10/1993 | Henochowicz et al. |
| 5,265,033 A | 11/1993 | Vajk et al. |
| 5,293,981 A | 3/1994 | Abe et al. |
| 5,299,672 A | 4/1994 | Nishiumi et al. |
| 5,299,673 A | 4/1994 | Wu |
| 5,302,811 A | 4/1994 | Fukatsu |
| 5,305,195 A | 4/1994 | Murphy |
| 5,316,120 A | 5/1994 | Ibarrola |
| 5,316,517 A | 5/1994 | Chiba et al. |
| 5,317,135 A | 5/1994 | Finocchio |
| 5,321,242 A | 6/1994 | Heath, Jr. |
| 5,328,014 A | 7/1994 | Nishiumi et al. |
| 5,330,041 A | 7/1994 | Dobbins et al. |
| 5,350,906 A | 9/1994 | Brody et al. |
| 5,355,988 A | 10/1994 | Shirasawa |
| 5,365,046 A | 11/1994 | Haymann |
| 5,374,814 A | 12/1994 | Kako et al. |
| 5,388,680 A | 2/1995 | Hird et al. |
| RE34,915 E | 4/1995 | Nichtberger et al. |
| 5,409,092 A | 4/1995 | Itako et al. |
| 5,429,222 A | 7/1995 | Delay |
| 5,435,777 A | 7/1995 | Takatani et al. |
| 5,440,108 A | 8/1995 | Tran et al. |
| 5,441,139 A | 8/1995 | Abe et al. |
| 5,449,058 A | 9/1995 | Kotler et al. |
| 5,457,305 A | 10/1995 | Akel et al. |
| 5,469,951 A | 11/1995 | Takemoto et al. |
| 5,479,507 A | 12/1995 | Anderson |
| 5,483,363 A | 1/1996 | Holmes et al. |
| 5,506,393 A | 4/1996 | Ziarno |
| 5,511,114 A | 4/1996 | Stimson et al. |
| 5,513,738 A | 5/1996 | Hird et al. |
| 5,531,640 A | 7/1996 | Inoue |
| 5,554,070 A | 9/1996 | Takatoshi et al. |
| 5,555,497 A | 9/1996 | Heibling |
| 5,560,467 A | 10/1996 | Takemoto et al. |
| 5,564,546 A | 10/1996 | Molbak et al. |
| 5,564,974 A | 10/1996 | Mazur et al. |
| 5,577,109 A | 11/1996 | Stimson et al. |
| 5,577,959 A | 11/1996 | Takemoto et al. |
| 5,620,079 A | 4/1997 | Molbak |
| 5,637,845 A | 6/1997 | Kolls |
| 5,650,604 A | 7/1997 | Marcous et al. |
| 5,652,421 A | 7/1997 | Veeneman et al. |
| 5,661,285 A | 8/1997 | Elrick et al. |
| 5,663,546 A | 9/1997 | Cucinotta et al. |
| 5,665,952 A | 9/1997 | Ziarno |
| D385,488 S | 10/1997 | Smith et al. |
| 5,679,070 A | 10/1997 | Ishida et al. |
| 5,696,908 A | 12/1997 | Muehlberger et al. |
| 5,699,328 A | 12/1997 | Ishizaki et al. |
| 5,721,768 A | 2/1998 | Stimson et al. |
| 5,732,398 A | 3/1998 | Tagawa |
| 5,734,722 A | 3/1998 | Halpern |
| 5,743,429 A | 4/1998 | Morofsky |
| 5,746,299 A | 5/1998 | Molbak et al. |
| 5,746,322 A | 5/1998 | LaVeine et al. |
| 5,748,908 A | 5/1998 | Yu |
| 5,777,305 A | 7/1998 | Smith et al. |
| 5,799,767 A | 9/1998 | Molbak |
| 5,835,061 A | 11/1998 | Stewart |
| 5,839,956 A | 11/1998 | Takemoto |
| 5,842,916 A | 12/1998 | Gerrity et al. |
| 5,988,348 A | 1/1999 | Martin et al. |
| 5,868,236 A | 2/1999 | Rademacher |
| 5,880,444 A | 3/1999 | Shibata |
| 5,903,880 A | 5/1999 | Biffar |
| 5,905,810 A | 5/1999 | Jones et al. |
| 5,909,792 A | 6/1999 | Gerlier et al. |
| 5,909,793 A | 6/1999 | Beach et al. |
| 5,909,794 A | 6/1999 | Molbak et al. |
| 5,943,423 A | 8/1999 | Muftic et al. |
| 5,943,655 A | 8/1999 | Jacobson |
| 5,953,504 A | 9/1999 | Sokal et al. |
| 5,956,697 A | 9/1999 | Usui |
| 5,964,830 A | 10/1999 | Durrett |
| 5,974,146 A | 10/1999 | Randle et al. |
| 5,982,918 A | 11/1999 | Mennie et al. |
| 5,991,413 A | 11/1999 | Arditti et al. |
| 6,014,636 A | 1/2000 | Reeder |
| 6,014,646 A | 1/2000 | Vallee et al. |
| 6,017,063 A | 1/2000 | Nilssen |
| 6,021,883 A | 2/2000 | Casanova et al. |
| 6,028,920 A | 2/2000 | Carson |
| 6,047,807 A | 4/2000 | Molbak |
| 6,047,808 A | 4/2000 | Neubarth et al. |
| 6,053,807 A | 4/2000 | Metzger et al. |
| 6,068,550 A | 5/2000 | Breitholtz et al. |
| 6,081,791 A | 6/2000 | Clark |
| 6,105,007 A | 8/2000 | Norris |
| 6,105,008 A | 8/2000 | Davis et al. |
| 6,105,009 A | 8/2000 | Cuervo |
| 6,110,044 A | 8/2000 | Stern |
| 6,116,402 A | 9/2000 | Beach et al. |
| 6,119,099 A | 9/2000 | Walker et al. |
| 6,119,945 A | 9/2000 | Muller et al. |
| 6,128,402 A | 10/2000 | Jones et al. |
| 6,129,275 A | 10/2000 | Urquhart et al. |
| 6,138,106 A | 10/2000 | Walker et al. |
| 6,144,946 A | 11/2000 | Iwamura |
| 6,152,365 A | 11/2000 | Kolls |
| 6,185,545 B1 | 2/2001 | Resnick et al. |
| 6,193,155 B1 | 2/2001 | Walker et al. |
| 6,196,371 B1 | 3/2001 | Martin et al. |
| 6,227,343 B1 | 5/2001 | Neathway et al. |
| 6,230,928 B1 | 5/2001 | Hanna et al. |
| 6,233,564 B1 | 5/2001 | Schulze, Jr. |
| 6,243,450 B1 | 6/2001 | Jansen et al. |
| 6,243,687 B1 | 6/2001 | Powell |
| 6,264,545 B1 | 7/2001 | Magee et al. |
| 6,267,292 B1 | 7/2001 | Walker et al. |
| 6,269,349 B1 | 7/2001 | Aieta et al. |
| 6,289,324 B1 | 9/2001 | Kawan |

(56) References Cited

U.S. PATENT DOCUMENTS

| | | |
|---|---|---|
| 6,292,211 B1 | 9/2001 | Pena |
| 6,308,887 B1 | 10/2001 | Korman et al. |
| 6,318,536 B1 | 11/2001 | Korman et al. |
| 6,318,537 B1 | 11/2001 | Jones et al. |
| 6,330,544 B1 | 12/2001 | Walker et al. |
| 6,349,972 B1 | 2/2002 | Geiger et al. |
| 6,363,164 B1 | 3/2002 | Jones et al. |
| 6,370,240 B1 | 4/2002 | Woynoski et al. |
| 6,370,514 B1 | 4/2002 | Messner |
| 6,375,080 B1 | 4/2002 | Cremonese |
| 6,390,269 B1 | 5/2002 | Billington et al. |
| 6,401,010 B1 | 6/2002 | Takahashi |
| 6,405,182 B1 | 6/2002 | Cuervo |
| 6,415,262 B1 | 7/2002 | Walker et al. |
| 6,456,981 B1 | 9/2002 | Dejaeger |
| 6,460,357 B1 | 10/2002 | Doi et al. |
| 6,484,863 B1 | 11/2002 | Molbak |
| 6,488,203 B1 | 12/2002 | Stoutenburg et al. |
| 6,494,776 B1 | 12/2002 | Molbak |
| 6,499,052 B1 | 12/2002 | Hoang et al. |
| 6,502,745 B1 | 1/2003 | Stimson et al. |
| 6,505,774 B1 | 1/2003 | Fulcher et al. |
| 6,536,037 B1 | 3/2003 | Guheen et al. |
| 6,554,184 B1 | 4/2003 | Amos |
| 6,575,361 B1 | 6/2003 | Graves et al. |
| 6,575,362 B1 | 6/2003 | Bator et al. |
| 6,594,644 B1 | 7/2003 | Van Dusen |
| 6,607,136 B1 | 8/2003 | Atsmon et al. |
| 6,628,934 B2 | 9/2003 | Rosenberg et al. |
| 6,637,576 B1 | 10/2003 | Jones et al. |
| 6,659,259 B2 | 12/2003 | Knox et al. |
| 6,661,910 B2 | 12/2003 | Jones et al. |
| 6,694,300 B1 | 2/2004 | Walker et al. |
| 6,704,039 B2 | 3/2004 | Pena |
| 6,705,448 B1 | 3/2004 | Steel |
| 6,736,251 B2 | 5/2004 | Molbak |
| 6,745,022 B2 | 6/2004 | Knox |
| 6,748,067 B2 | 6/2004 | Malik |
| 6,748,101 B1 | 6/2004 | Jones et al. |
| 6,758,316 B2 | 7/2004 | Molbak |
| 6,772,146 B2 | 8/2004 | Khemlani et al. |
| 6,778,693 B2 | 8/2004 | Jones et al. |
| 6,799,084 B2 | 9/2004 | Grobler |
| 6,823,172 B1 | 11/2004 | Forrest |
| 6,829,596 B1 | 12/2004 | Frazee |
| 6,854,581 B2 | 2/2005 | Molbak |
| 6,857,562 B2 | 2/2005 | Sasaki |
| 6,918,537 B2 | 7/2005 | Graves et al. |
| 6,934,529 B2 | 8/2005 | Bagoren |
| 6,945,457 B1 | 9/2005 | Barcelou |
| 6,960,986 B2 | 11/2005 | Asama et al. |
| 6,973,172 B1 | 12/2005 | Bitove et al. |
| 6,973,443 B2 | 12/2005 | Drummond et al. |
| 6,976,570 B2 | 12/2005 | Molbak |
| 6,999,569 B2 | 2/2006 | Risafi et al. |
| 7,006,993 B1 | 2/2006 | Cheong et al. |
| 7,028,827 B1 | 4/2006 | Molbak et al. |
| 7,028,891 B2 | 4/2006 | O'Neal |
| 7,039,603 B2 | 5/2006 | Walker et al. |
| 7,054,842 B2 | 5/2006 | James et al. |
| 7,058,581 B1 | 6/2006 | Young |
| 7,083,084 B2 | 8/2006 | Graves et al. |
| 7,093,761 B2 | 8/2006 | Smith et al. |
| 7,113,929 B1 | 9/2006 | Beach et al. |
| 7,131,580 B2 | 11/2006 | Molbak et al. |
| 7,156,300 B1 | 1/2007 | Dentlinger |
| 7,168,615 B2 | 1/2007 | Smith |
| 7,184,980 B2 | 2/2007 | Allen-Rouman et al. |
| 7,209,889 B1 | 4/2007 | Whitfield |
| 7,249,054 B2 | 7/2007 | Keil |
| 7,251,626 B2 | 7/2007 | Blackson et al. |
| 7,252,226 B2 | 8/2007 | Risaki et al. |
| 7,255,268 B2 | 8/2007 | Dentlinger |
| 7,266,533 B2 | 9/2007 | Karas et al. |
| 7,287,005 B1 | 10/2007 | Bruecken |
| 7,303,119 B2 | 12/2007 | Molbak |
| 7,311,249 B2 | 12/2007 | Smith et al. |
| 7,313,546 B2 | 12/2007 | Alarcom-Luther et al. |
| 7,328,190 B2 | 2/2008 | Smith et al. |
| 7,333,955 B2 | 2/2008 | Graves et al. |
| RE40,186 E | 3/2008 | Walker et al. |
| 7,343,349 B2 | 3/2008 | Ranzini et al. |
| 7,349,566 B2 | 3/2008 | Jones et al. |
| 7,356,507 B2 | 4/2008 | Bezos et al. |
| 7,398,225 B2 | 7/2008 | Voltmer et al. |
| 7,426,493 B2 | 9/2008 | Takeshima et al. |
| 7,473,177 B2 | 1/2009 | Walker et al. |
| 7,505,941 B2 | 3/2009 | Bishop et al. |
| 7,522,716 B2 | 4/2009 | Paschini |
| 7,527,193 B2 | 5/2009 | Molbak |
| 7,529,563 B1 | 5/2009 | Pitroda |
| 7,630,926 B2 | 12/2009 | Chakiris et al. |
| 7,634,425 B2 | 12/2009 | Satomi et al. |
| 7,647,259 B2 | 1/2010 | De Fabrega |
| 7,653,599 B2 | 1/2010 | Doran et al. |
| 7,660,767 B1 | 2/2010 | Schultz et al. |
| 7,676,431 B2 | 3/2010 | O'Leary et al. |
| 7,778,456 B2 | 8/2010 | Jones et al. |
| 7,780,075 B2 | 8/2010 | Cooper et al. |
| 7,865,432 B2 | 1/2011 | Doran et al. |
| 7,865,447 B2 | 1/2011 | Rosenhaft et al. |
| 7,874,478 B2 | 1/2011 | Molbak |
| 7,904,565 B2 | 3/2011 | Holden et al. |
| 7,971,699 B2 | 7/2011 | Molbak |
| 8,005,425 B2 | 8/2011 | Defosse et al. |
| 8,024,272 B2 | 9/2011 | Doran et al. |
| 8,033,375 B2 | 10/2011 | Doran et al. |
| 8,082,195 B2 | 12/2011 | Enzaldo |
| 8,083,133 B2 | 12/2011 | Seifert et al. |
| 8,103,586 B2 | 1/2012 | Doran et al. |
| 8,152,060 B2 | 4/2012 | Wolfe |
| 8,152,061 B2 | 4/2012 | Wolfe |
| 8,175,965 B2 | 5/2012 | Moore et al. |
| 8,229,851 B2 | 7/2012 | Doran et al. |
| 8,332,313 B2 | 12/2012 | Doran et al. |
| 8,438,073 B2 | 5/2013 | White |
| 8,447,650 B2 | 5/2013 | Postrel |
| 8,485,890 B2 | 7/2013 | Gagner et al. |
| 8,489,452 B1 | 7/2013 | Warner et al. |
| 8,494,956 B2 | 7/2013 | Tulluri et al. |
| 8,500,007 B2 | 8/2013 | Wolfe |
| 8,503,641 B2 | 8/2013 | Bushey |
| 8,504,473 B2 | 8/2013 | Paintin |
| 8,515,808 B2 | 8/2013 | Postrel |
| 8,528,814 B2 | 9/2013 | Wolfe |
| 8,528,828 B2 | 9/2013 | Fleischer et al. |
| 8,533,036 B2 | 9/2013 | Shukla |
| 8,533,037 B2 | 9/2013 | Postrel |
| 8,556,707 B2 | 10/2013 | Potts et al. |
| 8,566,169 B2 | 10/2013 | Bohanan et al. |
| 8,571,983 B1 | 10/2013 | Blackhurst et al. |
| 8,589,267 B2 | 11/2013 | Hurst |
| 8,589,297 B2 | 11/2013 | Enzaldo |
| 8,595,074 B2 | 11/2013 | Sharma et al. |
| 8,600,807 B1 | 12/2013 | Postrel |
| 8,602,297 B2 | 12/2013 | Wilen |
| 8,612,290 B2 | 12/2013 | Postrel |
| 8,631,999 B2 | 1/2014 | Wolfe et al. |
| 8,660,944 B2 | 2/2014 | Liu et al. |
| 8,762,278 B2 | 2/2014 | Miller |
| 8,668,146 B1 | 3/2014 | McGhie et al. |
| 8,675,840 B2 | 3/2014 | Risafi et al. |
| 8,676,672 B2 | 3/2014 | Nelsen |
| 8,701,982 B2 | 4/2014 | Yankovich et al. |
| 8,701,991 B2 | 4/2014 | Wolfe |
| 8,712,854 B1 | 4/2014 | Rafferty et al. |
| 8,725,564 B2 | 5/2014 | Postrel |
| 8,733,637 B1 | 5/2014 | Cedeno |
| 8,751,294 B2 | 6/2014 | Bhattacharya et al. |
| 8,820,634 B2 | 9/2014 | Wolfe |
| 8,874,467 B2 | 10/2014 | Yahn et al. |
| 8,887,999 B2 | 11/2014 | Wolfe |
| 8,967,324 B2 | 3/2015 | White |
| 9,002,737 B2 | 4/2015 | Wilen |

(56) References Cited

U.S. PATENT DOCUMENTS

| | | |
|---|---|---|
| 9,064,268 B2 | 6/2015 | Larrick |
| 9,129,294 B2 | 9/2015 | Yahn |
| 2001/0001856 A | 1/2001 | Gould et al. |
| 2001/0007098 A1 | 7/2001 | Hinrichs et al. |
| 2001/0007983 A1 | 7/2001 | Lee |
| 2001/0011680 A1 | 8/2001 | Soltesz et al. |
| 2001/0023409 A1 | 9/2001 | Keil |
| 2001/0029484 A1 | 10/2001 | Schultz et al. |
| 2001/0051902 A1 | 12/2001 | Messner |
| 2002/0026423 A1 | 2/2002 | Maritzen et al. |
| 2002/0032605 A1 | 3/2002 | Lee |
| 2002/0032641 A1 | 3/2002 | Mendiola et al. |
| 2002/0046341 A1 | 4/2002 | Kazaks et al. |
| 2002/0065724 A1 | 5/2002 | Tsuruda |
| 2002/0072974 A1 | 6/2002 | Pugliese et al. |
| 2002/0082962 A1 | 6/2002 | Farris et al. |
| 2002/0082994 A1 | 6/2002 | Herziger |
| 2002/0085037 A1 | 7/2002 | Leavitt et al. |
| 2002/0087462 A1 | 7/2002 | Seifert et al. |
| 2002/0091603 A1 | 7/2002 | Steiger et al. |
| 2002/0100660 A1 | 8/2002 | Stieber et al. |
| 2002/0107738 A1 | 8/2002 | Beach et al. |
| 2002/0112162 A1 | 8/2002 | Cocotis et al. |
| 2002/0147683 A1 | 10/2002 | Capobianco et al. |
| 2002/0156676 A1 | 10/2002 | Ahrens et al. |
| 2002/0162895 A1 | 11/2002 | Neto |
| 2002/0174235 A1 | 11/2002 | Likourezos |
| 2002/0188511 A1 | 12/2002 | Johnson et al. |
| 2002/0194122 A1 | 12/2002 | Knox et al. |
| 2003/0024979 A1 | 2/2003 | Hansen et al. |
| 2003/0037041 A1 | 2/2003 | Hertz |
| 2003/0046231 A1 | 3/2003 | Wu |
| 2003/0046249 A1 | 3/2003 | Wu |
| 2003/0081824 A1 | 5/2003 | Mennie et al. |
| 2003/0130940 A1 | 7/2003 | Hansen et al. |
| 2003/0149662 A1 | 8/2003 | Shore |
| 2003/0168508 A1 | 9/2003 | Dallenbach et al. |
| 2003/0173405 A1 | 9/2003 | Wilz et al. |
| 2003/0216969 A1 | 11/2003 | Bauer et al. |
| 2003/0233318 A1 | 12/2003 | King et al. |
| 2004/0024700 A1 | 2/2004 | Petigny |
| 2004/0088252 A1 | 5/2004 | Jenny |
| 2004/0098740 A1 | 5/2004 | Maritzen et al. |
| 2005/0038737 A1 | 2/2005 | Norris |
| 2005/0108104 A1 | 5/2005 | Woo |
| 2005/0108155 A1 | 5/2005 | Gallagher et al. |
| 2005/0144074 A1 | 6/2005 | Fredregill et al. |
| 2005/0171902 A1 | 8/2005 | Nguyen |
| 2005/0203835 A1 | 9/2005 | Nhaissi et al. |
| 2005/0203836 A1 | 9/2005 | Woodward et al. |
| 2005/0227769 A1 | 10/2005 | Morrow et al. |
| 2006/0064379 A1 | 3/2006 | Doran |
| 2006/0089908 A1 | 4/2006 | Keohane et al. |
| 2006/0131387 A1 | 6/2006 | Hansen et al. |
| 2006/0207856 A1 | 9/2006 | Dean et al. |
| 2006/0249568 A1 | 11/2006 | Scanlon |
| 2006/0261149 A1* | 11/2006 | Raghavendra Tulluri .................. G07F 19/20 235/379 |
| 2006/0287970 A1 | 12/2006 | Chess et al. |
| 2006/0293965 A1 | 12/2006 | Burton |
| 2007/0089064 A1 | 4/2007 | Facemire et al. |
| 2007/0125620 A1 | 6/2007 | Sorenson et al. |
| 2007/0234223 A1 | 10/2007 | Leavitt et al. |
| 2008/0052182 A1 | 2/2008 | Marshall |
| 2008/0072145 A1 | 3/2008 | Blanchard et al. |
| 2008/0082972 A1 | 4/2008 | De Sutter et al. |
| 2008/0162299 A1 | 7/2008 | Gusler et al. |
| 2008/0163079 A1 | 7/2008 | Haug |
| 2008/0172623 A1 | 7/2008 | Roche et al. |
| 2008/0288400 A1 | 11/2008 | Panthaki et al. |
| 2009/0069051 A1 | 3/2009 | Jain et al. |
| 2009/0240624 A1 | 9/2009 | James et al. |
| 2009/0242626 A1 | 10/2009 | Jones et al. |
| 2009/0265269 A1 | 10/2009 | Stoecker |
| 2009/0302103 A1 | 12/2009 | Kolinski-Schultz |
| 2009/0307622 A1 | 12/2009 | Jalon et al. |
| 2009/0313358 A1 | 12/2009 | Shepherd et al. |
| 2009/0320106 A1* | 12/2009 | Jones .................. G06Q 20/206 726/5 |
| 2010/0038419 A1* | 2/2010 | Blake .................. G07D 11/00 235/379 |
| 2010/0057612 A1 | 3/2010 | Wagenhals |
| 2010/0063906 A1 | 3/2010 | Nelsen |
| 2010/0082468 A1 | 4/2010 | Low |
| 2010/0122329 A1 | 5/2010 | Jakobsson et al. |
| 2010/0131413 A1 | 5/2010 | Kranzley et al. |
| 2010/0161487 A1 | 6/2010 | Patel et al. |
| 2010/0200654 A1 | 8/2010 | Wolfe et al. |
| 2011/0145109 A1 | 6/2011 | Watson |
| 2011/0184834 A1 | 7/2011 | Perrochon et al. |
| 2011/0225063 A1 | 9/2011 | Grunski et al. |
| 2011/0238549 A1 | 9/2011 | Poon |
| 2011/0264503 A1* | 10/2011 | Lenahan .................. G06Q 20/28 705/14.27 |
| 2011/0282784 A1 | 11/2011 | Nelsen |
| 2012/0054049 A1 | 3/2012 | Hayes |
| 2012/0059736 A1 | 3/2012 | Bhattacharya |
| 2012/0109787 A1 | 5/2012 | Larrick et al. |
| 2012/0124496 A1 | 5/2012 | Rose et al. |
| 2012/0137235 A1 | 5/2012 | T S et al. |
| 2012/0143705 A1 | 6/2012 | Bhattacharya et al. |
| 2012/0156976 A1 | 6/2012 | Blake et al. |
| 2012/0173351 A1 | 7/2012 | Hanson et al. |
| 2012/0259698 A1 | 10/2012 | Yurow |
| 2012/0310848 A1 | 12/2012 | Gao et al. |
| 2012/0323787 A1 | 12/2012 | Nelsen |
| 2013/0066735 A1 | 3/2013 | Llach |
| 2013/0080235 A1 | 3/2013 | Wolfe |
| 2013/0080325 A1* | 3/2013 | Schatt .................. G07F 19/206 705/44 |
| 2013/0091055 A1 | 4/2013 | Doran et al. |
| 2013/0065686 A1 | 5/2013 | LeMay et al. |
| 2013/0144732 A1 | 6/2013 | Rothschild |
| 2013/0159130 A1 | 6/2013 | Gaur et al. |
| 2013/0161153 A1 | 6/2013 | Saez et al. |
| 2013/0191178 A1 | 7/2013 | Thompson et al. |
| 2013/0191202 A1 | 7/2013 | Postrel |
| 2013/0204681 A1 | 8/2013 | Kraft et al. |
| 2013/0204686 A1 | 8/2013 | Roberts et al. |
| 2013/0204781 A1 | 8/2013 | Flitcroft et al. |
| 2013/0246209 A1 | 9/2013 | White |
| 2013/0254074 A1 | 9/2013 | Joa et al. |
| 2013/0254086 A1 | 9/2013 | Joa et al. |
| 2013/0254106 A1 | 9/2013 | Webber et al. |
| 2013/0268413 A1 | 10/2013 | Burr et al. |
| 2013/0275246 A1 | 10/2013 | Ramaratnam |
| 2013/0297473 A1 | 11/2013 | Wolfe |
| 2013/0304559 A1 | 11/2013 | Stone et al. |
| 2013/0304620 A1 | 11/2013 | Bhattacharya et al. |
| 2014/0006268 A1 | 1/2014 | Roberts et al. |
| 2014/0012647 A1 | 1/2014 | Hecht |
| 2014/0032328 A1 | 1/2014 | Greenfield |
| 2014/0046784 A1 | 2/2014 | Prakash et al. |
| 2014/0052525 A1 | 2/2014 | Postrel |
| 2014/0058868 A1 | 2/2014 | Sharma et al. |
| 2014/0081736 A1 | 3/2014 | Blackhurst et al. |
| 2014/0095218 A1 | 4/2014 | Golembeski |
| 2014/0100939 A1 | 4/2014 | Postrel |
| 2014/0108196 A1 | 4/2014 | Yankovich et al. |
| 2014/0122324 A1 | 5/2014 | Spier |
| 2014/0122327 A1 | 5/2014 | Aleles et al. |
| 2014/0122331 A1 | 5/2014 | Vaish et al. |
| 2014/0136351 A1 | 5/2014 | Lennon |
| 2014/0143089 A1 | 5/2014 | Campos et al. |
| 2014/0156511 A1 | 6/2014 | Ren |
| 2014/0156512 A1 | 6/2014 | Rahman et al. |
| 2014/0201012 A1 | 7/2014 | Doran et al. |
| 2014/0236841 A1 | 8/2014 | Tan et al. |
| 2014/0257958 A1 | 9/2014 | Andrews |
| 2014/0289111 A1 | 9/2014 | Doran et al. |
| 2015/0012305 A1 | 1/2015 | Truskovsky et al. |
| 2015/0017611 A1 | 1/2015 | Moumneh |
| 2015/0025987 A1 | 1/2015 | Yahn et al. |

(56) References Cited

U.S. PATENT DOCUMENTS

| | | | |
|---|---|---|---|
| 2015/0170124 A1 | 6/2015 | Sorenson et al. |
| 2015/0254707 A1 | 9/2015 | Larrick et al. |
| 2015/0278801 A1 | 10/2015 | Friedlander |
| 2016/0125548 A1 | 5/2016 | Bowles et al. |
| 2016/0232609 A1 | 8/2016 | Lindemulder et al. |
| 2017/0011387 A1 | 1/2017 | Lennon et al. |
| 2017/0039559 A1 | 2/2017 | Frieden |
| 2017/0148001 A1 | 5/2017 | Stock |
| 2017/0323282 A1 | 11/2017 | Doran et al. |
| 2018/0000594 A1 | 1/2018 | Yahn |
| 2018/0365744 A1 | 12/2018 | Lennon |

FOREIGN PATENT DOCUMENTS

| | | |
|---|---|---|
| CA | 2067987 | 11/1992 |
| CA | 2421308 | 3/2002 |
| CH | 680171 | 6/1992 |
| DE | 660354 | 5/1938 |
| DE | 2528735 | 9/1976 |
| DE | 3021327 | 12/1981 |
| DE | 3147603 | 6/1983 |
| EP | 0313294 | 4/1989 |
| EP | 0351217 | 1/1990 |
| EP | 0420163 | 4/1991 |
| EP | 0458610 | 11/1991 |
| EP | 0477722 | 4/1992 |
| EP | 0857579 | 8/1998 |
| EP | 2367150 | 4/1999 |
| EP | 0924662 | 6/1999 |
| EP | 0924664 | 6/1999 |
| EP | 0924665 | 6/1999 |
| EP | 1178448 | 6/2000 |
| FR | 2042254 | 2/1971 |
| FR | 2342531 | 9/1977 |
| GB | 958741 | 5/1964 |
| GB | 1564723 | 4/1980 |
| GB | 2095452 | 9/1982 |
| GB | 2121582 | 12/1983 |
| GB | 2153128 | 8/1985 |
| GB | 2188467 | 3/1986 |
| GB | 2175427 | 11/1986 |
| GB | 2186411 | 8/1987 |
| GB | 2198274 | 6/1988 |
| GB | 2223340 | 4/1990 |
| GB | 2223872 | 4/1990 |
| GB | 2255666 | 11/1992 |
| IE | 80670 | 11/1998 |
| JP | 5249892 | 4/1977 |
| JP | 5250296 | 4/1977 |
| JP | 1258092 | 10/1989 |
| JP | 1307891 | 12/1989 |
| JP | 2081193 | 3/1990 |
| JP | 363795 | 3/1991 |
| JP | 392994 | 4/1991 |
| JP | 4315288 | 4/1991 |
| JP | 4344995 | 5/1991 |
| JP | 3252795 | 11/1991 |
| JP | 2006301807 | 11/2006 |
| JP | 2007241925 | 9/2007 |
| JP | 2007257578 | 10/2007 |
| SE | 44244 | 6/1916 |
| SE | 8801851 | 11/1989 |
| SE | 44247 | 10/2016 |
| SE | 50250 | 11/2019 |
| WO | WO9406101 | 3/1994 |
| WO | WO9409440 | 4/1994 |
| WO | WO9530215 | 11/1995 |
| WO | WO9626508 | 8/1996 |
| WO | WO9630877 | 10/1996 |
| WO | WO9825241 | 6/1998 |
| WO | WO9836521 | 8/1998 |
| WO | WO0025507 | 10/1998 |
| WO | WO9900772 | 1/1999 |
| WO | WO9928830 | 6/1999 |
| WO | WO9950785 | 10/1999 |
| WO | WO0010138 | 2/2000 |
| WO | WO0011568 | 3/2000 |
| WO | WO0207071 | 7/2000 |
| WO | WO0209001 | 7/2000 |
| WO | WO0075889 | 12/2000 |
| WO | WO02075680 | 3/2001 |
| WO | WO0139093 | 5/2001 |
| WO | WO2001037172 | 5/2001 |
| WO | WO0142945 | 6/2001 |
| WO | WO0159722 | 8/2001 |
| WO | WO0191035 | 11/2001 |
| WO | WO03046845 | 11/2001 |
| WO | WO03071386 | 2/2002 |
| WO | WO03071387 | 2/2002 |
| WO | WO03071495 | 2/2002 |
| WO | WO2008015637 | 2/2008 |
| WO | WO2008027324 | 3/2008 |
| WO | WO2017027235 A1 | 2/2017 |

OTHER PUBLICATIONS

"Cash in your jar of change without paying fees to do it," Nov. 21, 2009, available at http://www.examiner.com/article/cash-your-jar-of-change-without-paying-fees-to-do-it.
1-800 Gift Certificate, http://www.800giftcertificate.com, accessed Feb. 16, 1999, 12 pages.
Bedienungsanleitung CDS 500/MCC 500, 1991, 9 pages.
Cash, M., "Bank blends new technology with service", *Winnepeg Free Press*, Sep. 4, 1992, 1 page.
F. Zimmerman & Co., "Reference Manual Contovit/Sortovit, Perconta Money Counting and Sorting Systems", Aug. 1995, pp. I-III, 1-31, and three pages of specifications.
First USA: First USA Introduces the Gift Card: Pre-Paid Visa Card Works Better than a Gift Certificate, Business Editors, Nov. 12, 1998, 3 pages.
Fri Kopenskap articles, Mar. 18, 1988, Apr. 27, 1989 and Nov. 25, 1988, 6 pages.
Geldinstitute Literature, Mar. 1990 and Apr.-May 1992, 2 pages.
Gift Certificate Express, http://www.giftcertificateexpress.com, accessed Feb. 16, 1999, 10 pages.
Hamilton, "Turning Cans into Cold Cash", *The Washington Post*, Jul. 2, 1991, pp. D1, D4, pp. 194-209.
Leitch, C., "High-tech bank counts coins," *Innovations*, Report on Business, Sep. 18, 1991, 1 page.
Llemeon, J., "Royal's Burlington drive-in bank provides customers 24-hour tellers," *Business Today, The Toronto Star*, Aug. 21, 1991, 1 page.
NCR, "NCR 7401 Retail Self-Service Solution," 1999, 2 pages.
NCR, "NCR 7800 Consumer Price Verifier," http://www3.ncr.com/product/retail/product/catalog/7800.shtml, accessed Mar. 18, 1999, pp. 1-2.
Quora, "Why don't retailers buy back their own gift cards at a discount?" 2013. Retrieved from the internet on Aug. 19, 2016 at <https://www.quora.com/Why-don't-retailers-buy-back-their-own-gift-cards-at-a-discount>.
Reis Eurosystems Geldbearbeitungssysteme, "Test-Programme CS 3110 Selectronic coin sorting and counting machine," Jul. 1992, pp. 1-3.
Reis Eurosystems, "Operating Instructions CS 3110 Selectronic Coin Sorting and Counting Machine With Central Sensor", Jul. 1992, pp. 1-12, I-IV.
Slide Changing Apparatus With Slide Jam Protection, Research Disclosure 30509, Sep. 1989, 3 pages.
Spectrum One, "Spectrum One? Network Solutions for Wireless Data Capture," <http://www.symbol.com/ST0000129.HTM>, accessed Mar. 18, 1999, pp. 1-5.
Super Branch Literature, Feb. 1992, 2 pages.
SymbolSolutions, "Supermarket Buys Two Solutions for the Price of One," http://www.symbol.com/solution/017SS.HTM, accessed Mar. 18, 1999, pp. 1-3.
Translated Article from Praktiskt Butiksarbete, Sep. 1992, 2 pages.

* cited by examiner

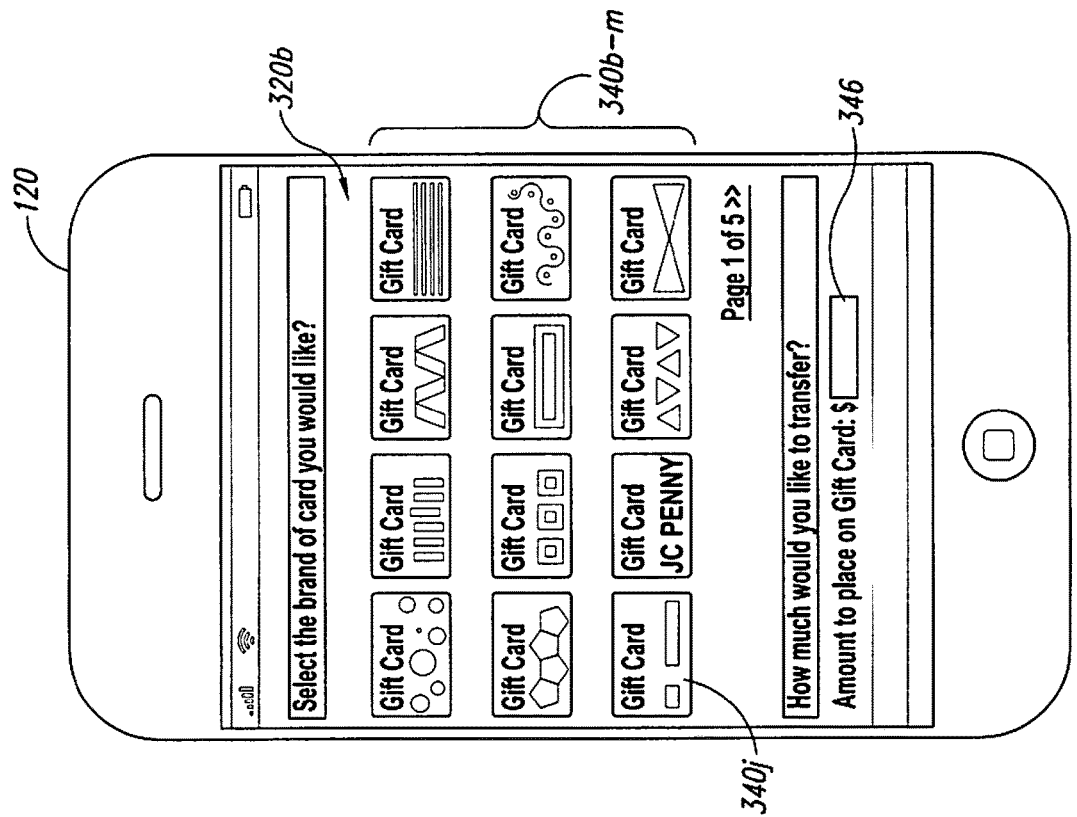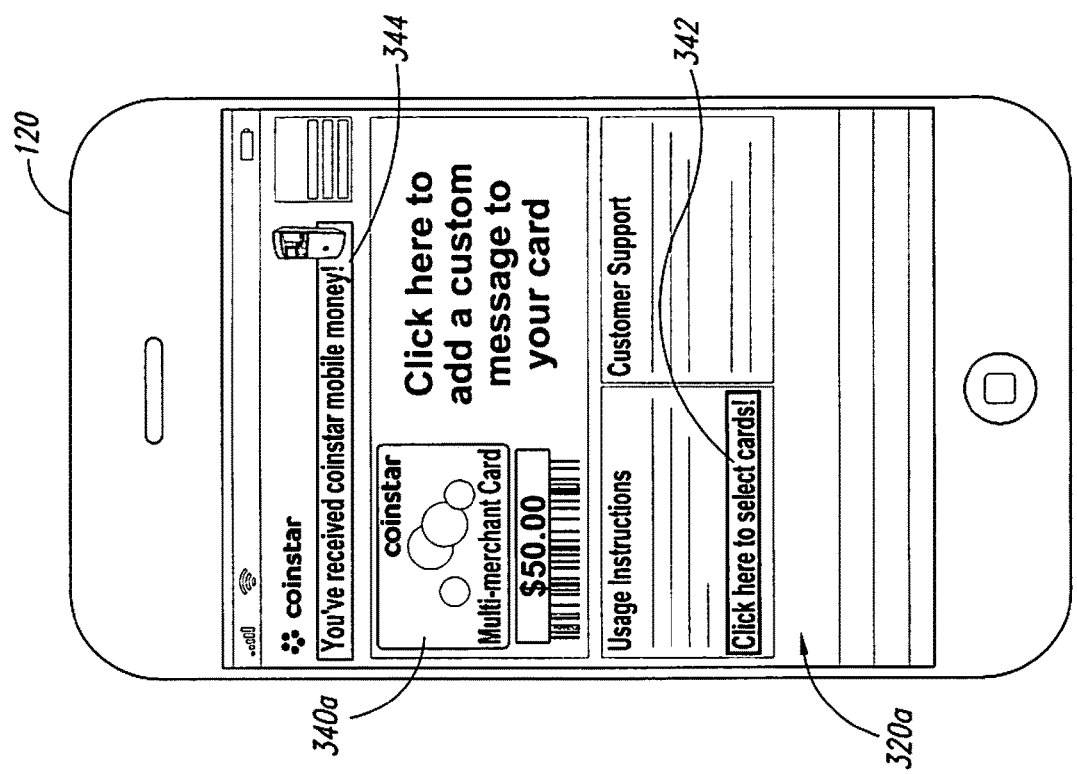
Fig. 3B
Fig. 3A

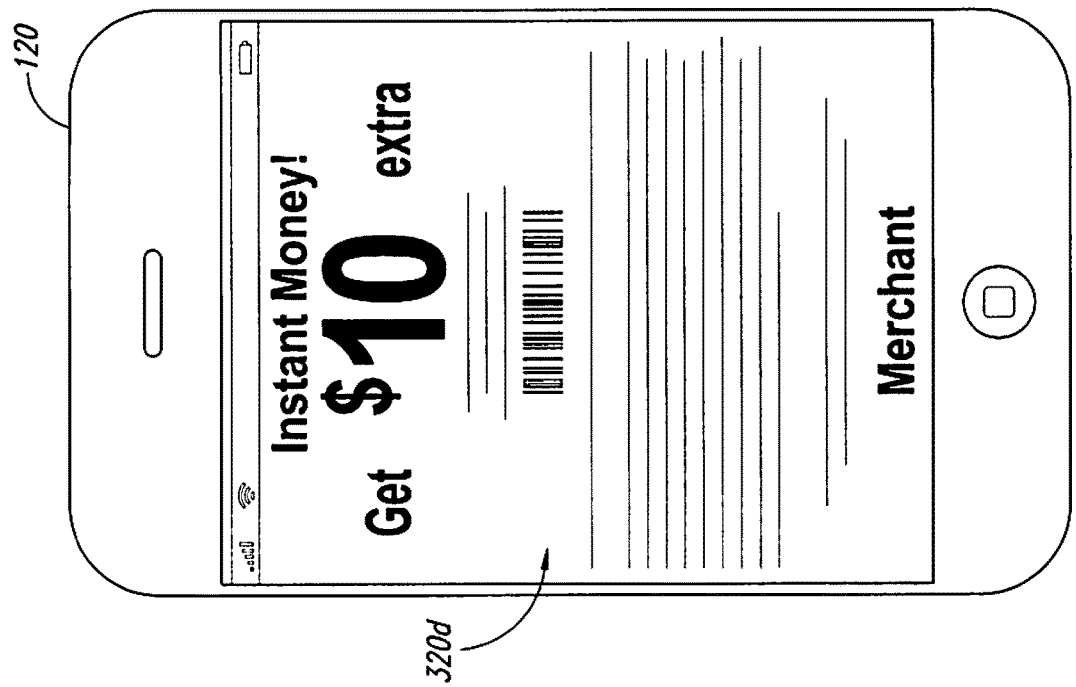
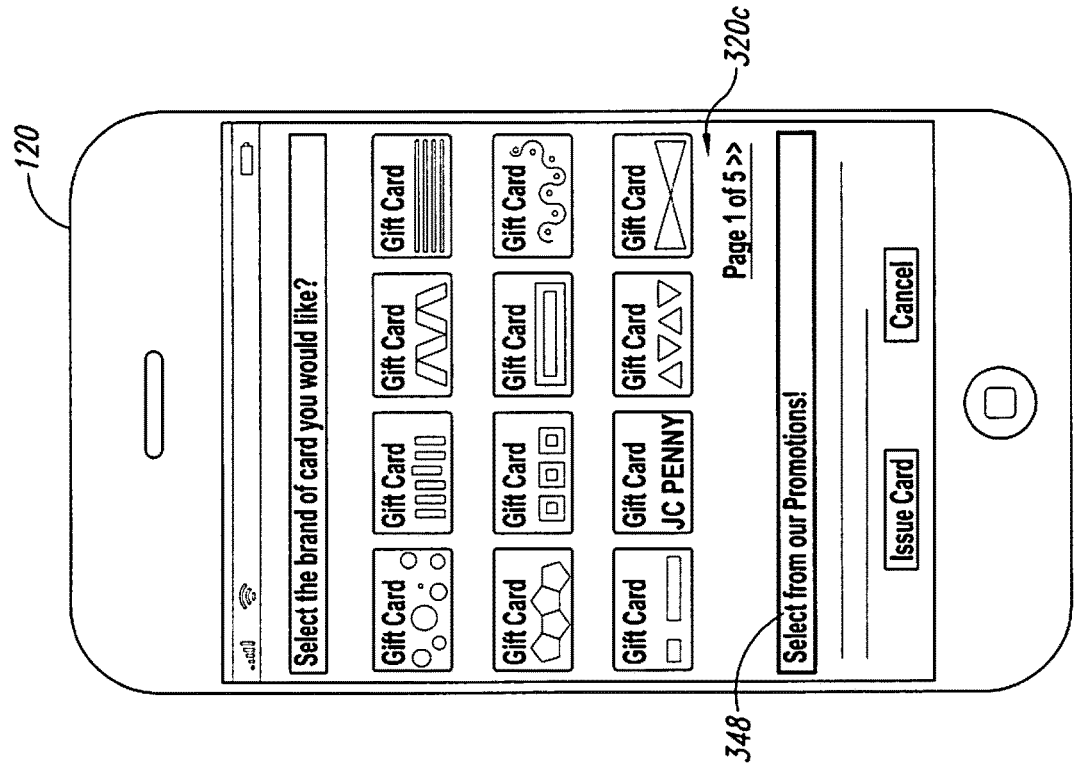
Fig. 3C
Fig. 3D

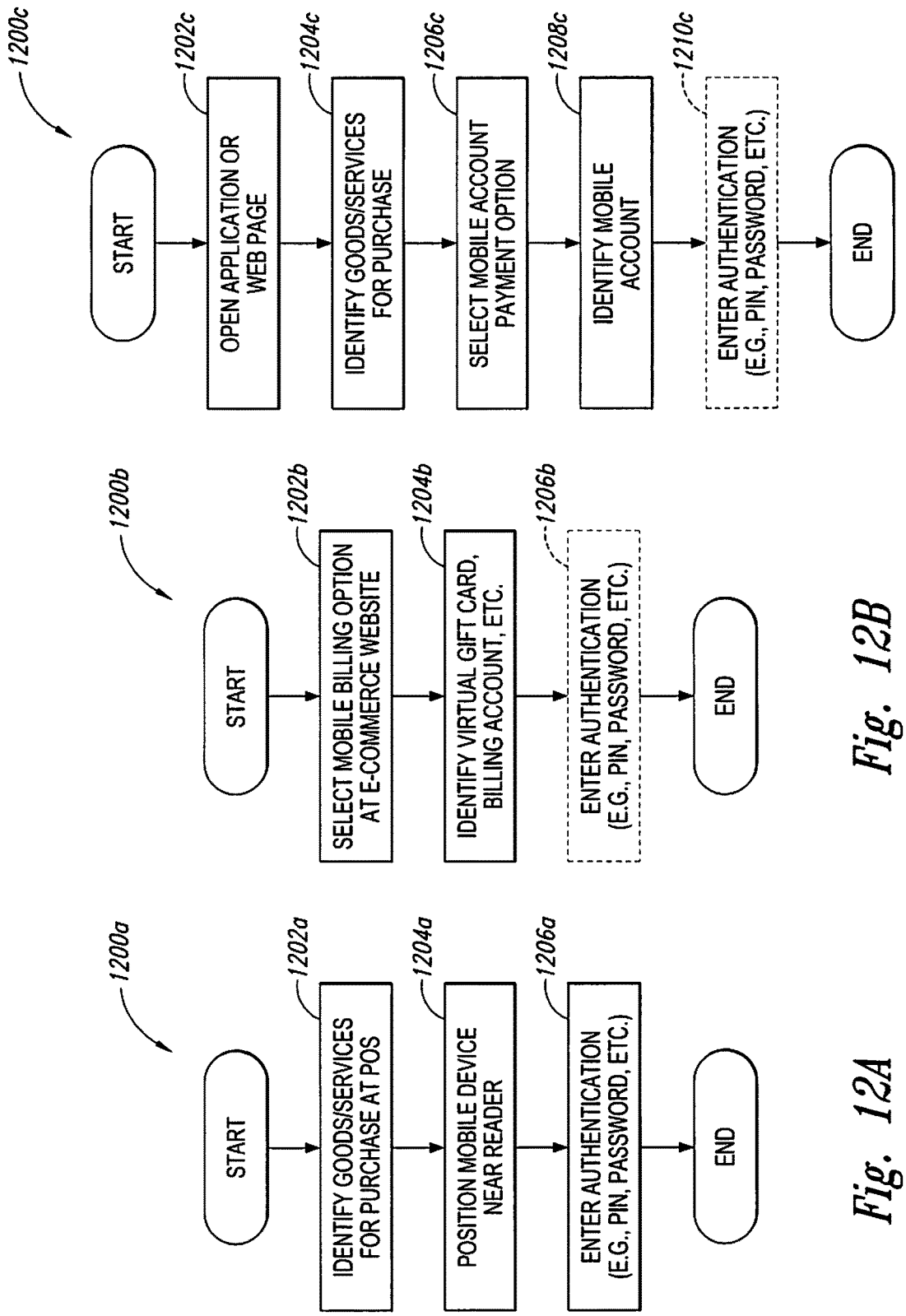

MOBILE COMMERCE PLATFORMS AND ASSOCIATED SYSTEMS AND METHODS FOR CONVERTING CONSUMER COINS, CASH, AND/OR OTHER FORMS OF VALUE FOR USE WITH SAME

CROSS-REFERENCE TO APPLICATION(S) INCORPORATED BY REFERENCE

The present application is a continuation of U.S. patent application Ser. No. 15/705,915, filed Sep. 15, 2017, which is a continuation of U.S. patent application Ser. No. 14/507,636, filed Oct. 6, 2014, now U.S. Pat. No. 9,766,014, which is a continuation of U.S. patent application Ser. No. 13/304,254, filed Nov. 23, 2011, now U.S. Pat. No. 8,874,467 and titled "MOBILE COMMERCE PLATFORMS AND ASSOCIATED SYSTEMS AND METHODS FOR CONVERTING CONSUMER COINS, CASH, AND/OR OTHER FORMS OF VALUE FOR USE WITH SAME," which is incorporated herein in its entirety by reference.

TECHNICAL FIELD

The present disclosure is generally related to systems and associated methods for converting coin value, cash value, and/or other forms of value for use with various types of commerce platforms.

BACKGROUND

Consumer-operated coin counting kiosks that exchange loose coins for redeemable cash vouchers and other tangible forms of value are in wide use today. Such machines can include, for example, the machines disclosed in U.S. Pat. Nos. 7,971,699, 7,874,478, 7,520,374, and 8,033,375; each of which is incorporated herein by reference in its entirety. Some of these machines count consumer coins and dispense redeemable cash vouchers, while others may offer other type of purchasing instruments such as "e-certificates" for making online purchases, pre-paid gift cards and card facsimiles, etc.

In many of these existing options, the coin counting kiosks dispense some form of tangible output (e.g., a voucher, e-certificate, card, etc.) in return for the coins. Vouchers can be redeemed for cash and/or merchandize at a point of sale (POS) in a retail establishment. In the case of e-certificates, the consumer inputs a code from the e-certificate when making an online purchase. Prepaid cards can be used to make purchases at POSs with a conventional magnetic stripe card reader.

One shortcoming of these conventional options is that the raw materials for producing the different types of tangible outputs must be continually stocked in the machine and, oftentimes, printed prior to dispensing. The stocking, printing, and dispensing of these materials adds cost to the operation and maintenance of the coin counting kiosks. Accordingly, although each of these options has its benefits, it would also be advantageous to provide consumers with additional options for converting loose coins, cash, etc. to other forms of readily usable and widely accepted payment instruments.

BRIEF DESCRIPTION OF THE DRAWINGS

FIGS. 3A-3F are a series of schematic diagrams illustrating various displays for implementing aspects of a mobile commerce system configured in accordance with embodiments of the present disclosure.

FIGS. 12A-12C are a series of flow diagrams illustrating various routines for purchasing goods and/or services with mobile commerce platforms configured in accordance with embodiments of the present disclosure.

DETAILED DESCRIPTION

Figure 1:
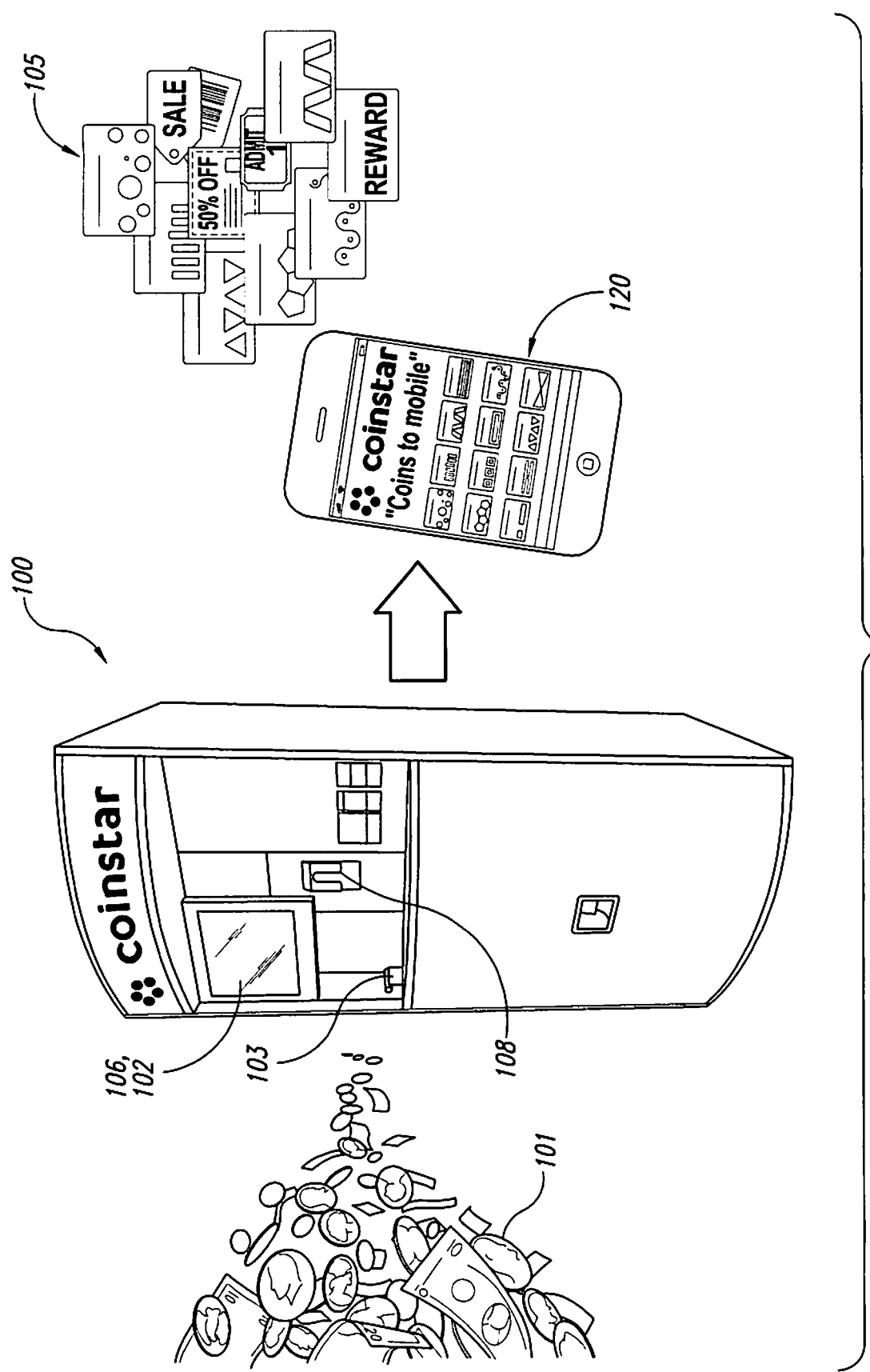
FIG. 1 is a schematic diagram illustrating some aspects of a mobile commerce kiosk system configured in accordance with embodiments of the present disclosure.

The following disclosure describes various embodiments of systems and methods for transferring the value of coins, cash, and/or other types of funds to mobile commerce platforms, such as electronic payment applications implemented by mobile devices (e.g., smart phones) and other computer-implement devices. In various embodiments, for example, a consumer operated kiosk is configured to receive loose coins and/or cash from a consumer, and count the coins and/or cash to determine a total value. The consumer can then select (via, e.g., a touch screen or other suitable input device) whether to have all or a portion of the value transferred to a mobile device (e.g., a smart phone, personal digital assistant (PDA), enterprise digital assistant, tablet computer, or other handheld computing device) for making purchases with a mobile commerce platform, such as a "mobile wallet" application implemented by the smart phone or other mobile device.

If the consumer wishes to have all or a portion of the deposited value transferred to a mobile device, the consumer enters a device address (e.g., a phone number) and positions the device within a suitable range of the kiosk (e.g., within a suitable range for near field communication (NFC)). In some embodiments, the kiosk then wirelessly communicates (via, e.g., a Short Message Service (SMS) text message) the value information to the mobile device. In other embodiments, the kiosk can transfer or otherwise communicate the value information to the mobile device via a temporary wired connection, such as a USB port, electronic docking station, etc. Once transferred, the funds can then be used to make wireless purchases of goods and/or services via, for example, a virtual gift card account and/or other facilities implemented by the mobile device.

As used herein, the term "mobile wallet" can refer generally to an electronic commerce account implemented by a mobile phone or other mobile wireless device. In some embodiments, mobile wallets store "virtual gift cards," virtual loyalty cards, etc.; transfer value; and/or conduct transactions for, e.g., purchasing goods and/or services from suitably enabled merchants. The term "virtual gift card" can refer to an application program operating on the mobile device that performs like a prepaid card, such as a gift card. Virtual gift cards can enable the user to wirelessly purchase items and/or services, pay bills, and/or conduct other transactions with retailers and other merchants via, e.g., a wirelessly enabled point of sale (POS) terminal, the Internet, and/or other computer networks.

In some embodiments, "open loop" or "network" virtual gift cards (implemented by, e.g., Google Wallet, ISIS™, etc.) may be issued by banks or credit card companies, and may be redeemed by any suitably equipped merchant. In comparison, "closed loop" virtual gift cards may be issued by a specific retailer, restaurant or other merchant, and may only be redeemed by the issuing provider or a limited group of merchants. In some embodiments, the consumer can allocate funds between one or more branded virtual gift card accounts associated with specific retailers or usable at multiple retailers. The consumer can then pay for items at the corresponding stores, restaurants, etc. by simply tapping or swiping their mobile device in the proximity (e.g., in the near field) of any POS terminal equipped with suitable NFC technology, mobile commerce software, and/or other mobile payment platform solution. Aspects of the foregoing embodiments overcome shortcomings in the prior art by enabling consumers to quickly and easily transfer loose coin, cash, etc. to a wireless commerce platform that can be implemented at a wide range of retailers and via other consumer commerce pathways without requiring the manufacture, stocking, printing, dispensing, tracking, and/or tendering of paper vouchers, e-certificates, pre-paid cards, card facsimiles and/or other tangible types of payment instruments.

Certain details are set forth in the following description and in FIGS. 1-12C to provide a thorough understanding of various embodiments of the present technology and disclosure. In other instances, well-known structures, materials, operations and/or systems often associated with wireless technology, mobile devices, smart phones, mobile commerce platforms and functionalities, are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the disclosure. Indeed, certain terms may even be emphasized below; however, any terminology intended to be interpreted in any restricted manner will be overtly and specifically defined as such in this Detailed Description section.

The accompanying Figures depict embodiments of the present technology and are not intended to limit the scope of this disclosure. Many of the details, dimensions and other features shown in the Figures are merely illustrative of particular embodiments of the disclosure. Accordingly, other embodiments can have other details, dimensions and features without departing from the spirit or scope of the present invention. For example, the sizes of various depicted elements are not necessarily drawn to scale, and various elements may be arbitrarily enlarged and/or simplified to improve legibility. Component details may be abstracted in the Figures to exclude details such as position of components and certain precise connections between such components when such details are unnecessary for a complete understanding of how to make and use the invention. Those of ordinary skill in the art will also appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is schematic diagram illustrating various aspects of a system for converting coins and/or cash to funds for use with a mobile commerce platform in accordance with an embodiment of the present disclosure. The schematic diagram illustrates that coins, cash and/or other forms of currency and value 101 can be deposited in, for example, a coin input region 103 (e.g., a pivoting coin tray) of a consumer operated coin counting kiosk 100. The kiosk 100 can include a coin counting apparatus for counting the deposited coins and determining a value, as disclosed in, for example, U.S. Pat. No. 7,971,699, entitled "COIN COUNTER/SORTER AND COUPON/VOUCHER DISPENSING MACHINE AND METHOD;" U.S. Pat. No. 7,874,478, entitled "COIN COUNTER AND VOUCHER DISPENSING MACHINE AND METHOD;" U.S. Pat. No. 8,033,375, entitled "METHODS AND SYSTEMS FOR EXCHANGING AND/OR TRANSFERRING VARIOUS FORMS OF VALUE;" U.S. Pat. No. 7,113,929, entitled "SYSTEM FOR VOUCHER OR TOKEN VERIFICATION;" and U.S. patent application Ser. No. 11/294,637, entitled "METHODS AND SYSTEMS FOR EXCHANGING AND/OR TRANSFERRING VARIOUS FORMS OF VALUE" and filed Dec. 5, 2005; each of which is incorporated herein in its entirety by reference.

Embodiments of the kiosk 100 can also include, for example, one or more output devices 108 (e.g., outlet slots for dispensing redeemable cash vouchers, e-certificates, prepaid cards, etc.), and one or more display devices 106 (e.g., a display screen, such as an LCD screen) for displaying various options and prompts to consumers and, in some embodiments, receiving user selections via an input device 102, such as a touch screen (not shown in detail in FIG. 1).

As described in greater detail below, after a user (not shown) has input funds (e.g., loose coins) into the kiosk 100 and the kiosk 100 has counted the coins to determine a value, the user can position a wireless-enabled mobile device 120 (e.g., a mobile computing device such as a smart phone) in proximity of the kiosk (e.g., within a distance suitable for near field communication (NFC)), and the kiosk can wirelessly transfer the funds, or a portion of the funds to the mobile device 120 (e.g., to an application for implementing mobile commerce with the mobile device 120). As is known, NFC can refer to relatively short-range, high-frequency wireless communication technology that enables the exchange of data between devices positioned within a proximity of from about 4 inches to about 6 inches. In other embodiments, wireless communication between the kiosk 100 and the mobile device 120 can be implemented using other protocols and/or other positional ranges between the kiosk 100 and the mobile device 120. In still further embodiments, such wireless communication between the kiosk 100 and the mobile device 120 can be implemented with other forms of wireless technology, including Bluetooth communication technologies that enable communication over greater distances. Accordingly, the various embodiments of the present technology are not limited to any particular form of wireless technology.

Once the coin value has been transferred to the mobile device 120, the consumer can utilize the value for various types of mobile payment solutions. Such solutions can include, for example, purchasing goods and/or services at a retailer by scanning the mobile device 120 by a terminal having the relevant NFC technology, by using suitable mobile commerce software known to those of ordinary skill in the art, and/or by implementing other known forms of mobile payment solutions. Such mobile commerce software and solutions can include software that enables use of "mobile wallets."

Figure 2A:
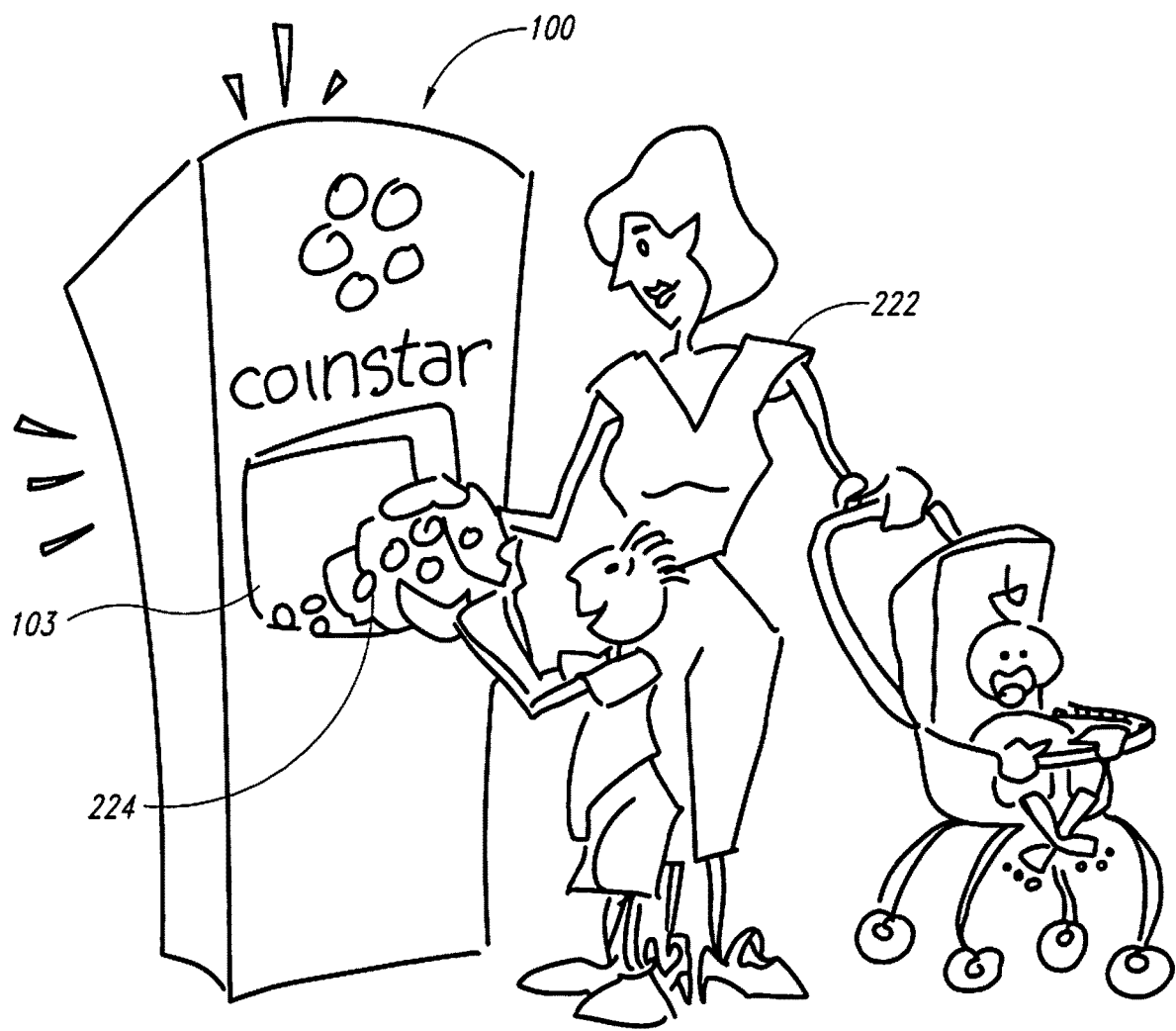
FIGS. 2A-2D are a series of schematic diagrams illustrating various functional aspects of a mobile commerce system configured in accordance with embodiments of the present disclosure.

FIGS. 2A-2D are a series of schematic representations of various stages of a consumer experience when using the kiosk 100 in accordance with embodiments of the present disclosure. Referring first to FIG. 2A, a consumer or user 222 inputs funds (e.g., a plurality of loose coins 224) into the kiosk 100 via the coin receiving region 103. The kiosk 100 can then display or otherwise provide the consumer 222 with various options for converting her coins into other forms of value, including an option for transferring the coin value to a mobile wallet or other mobile account. Such options may include using the transferred funds to top off an existing mobile wallet or virtual gift card, or to create a new mobile account.

Figure 2B:
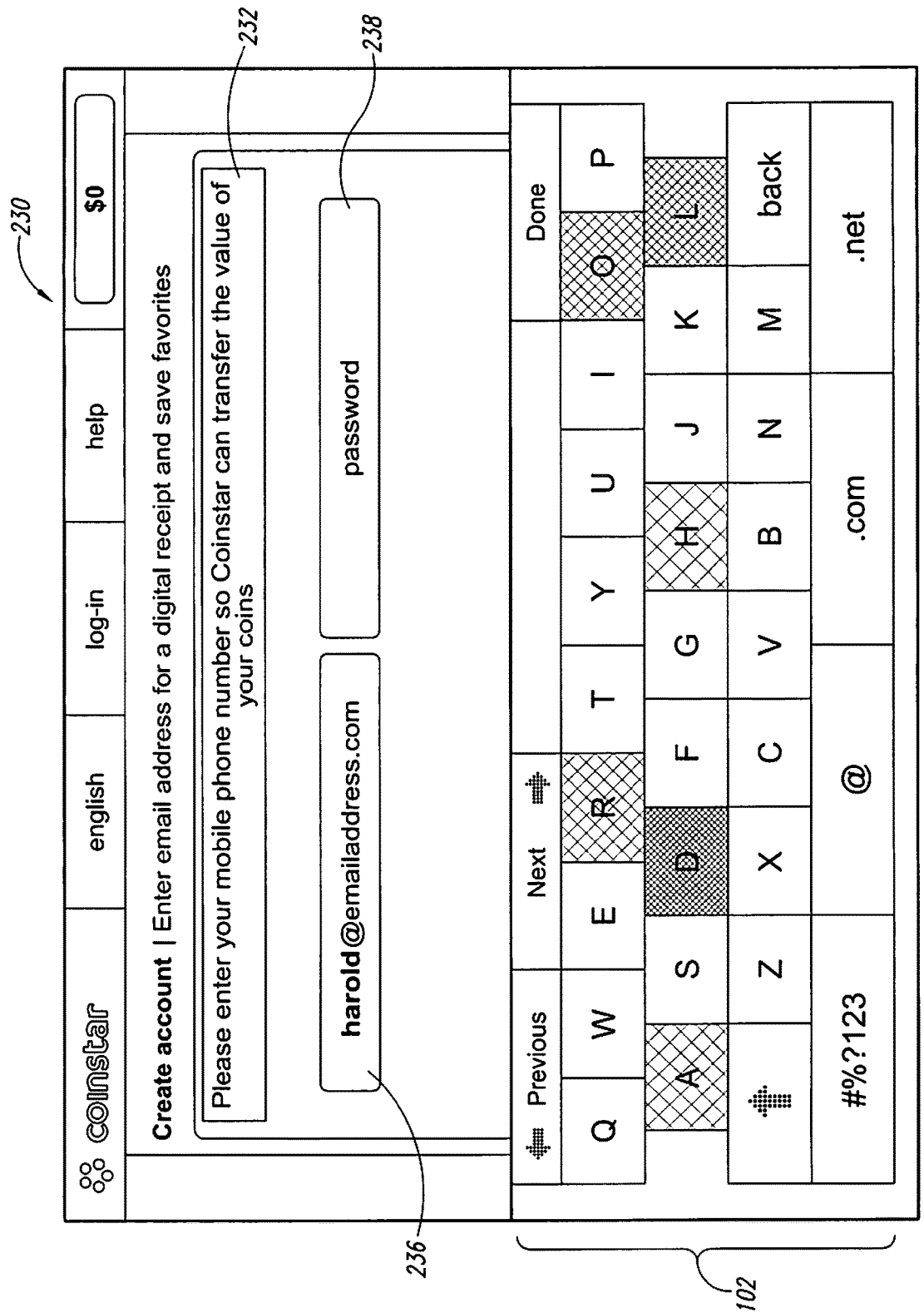
Figure 2C:
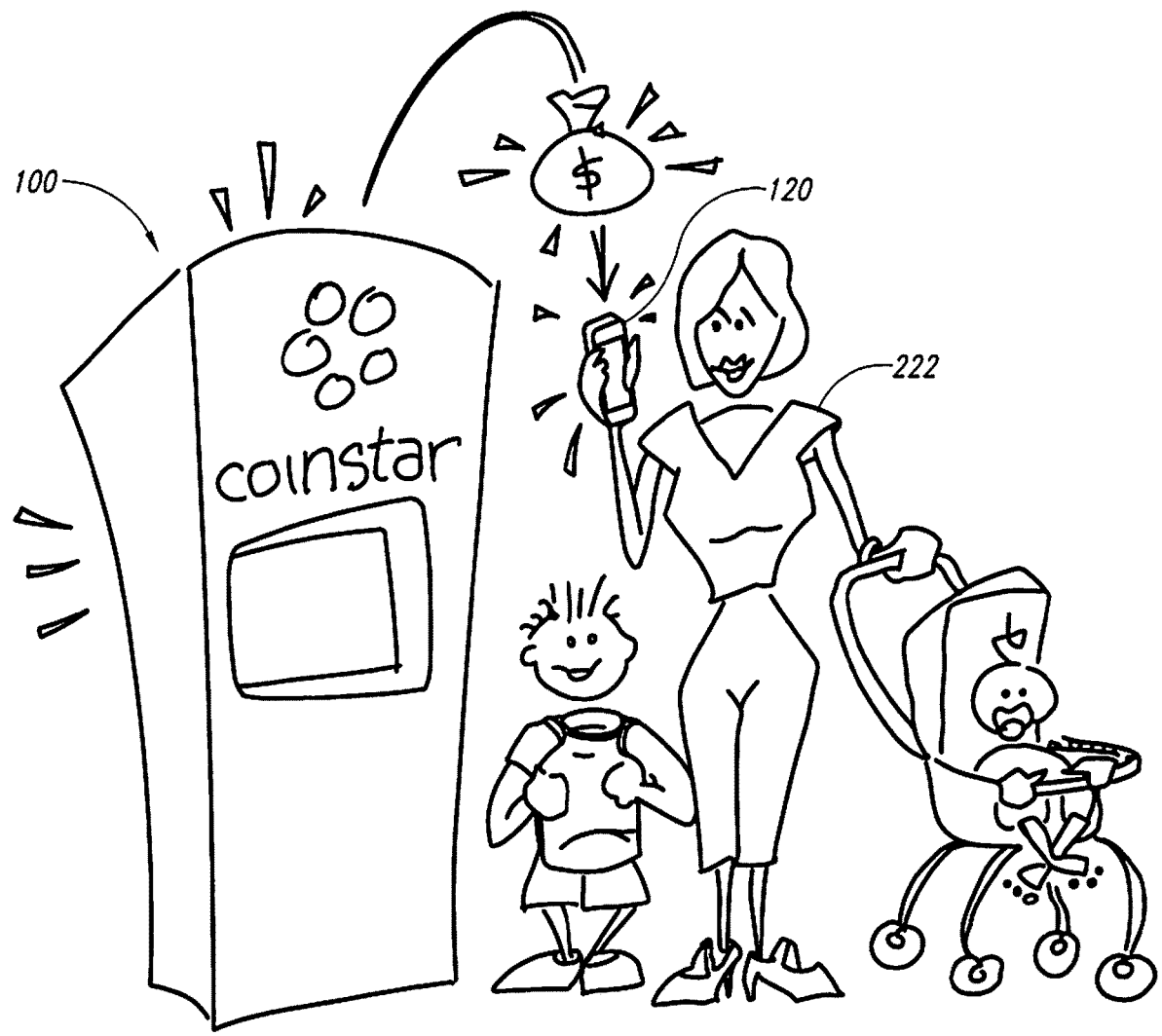

Turning next to FIG. 2B, this figure illustrates a representative display page 230 that can, for example, be displayed to the consumer 222 via the kiosk display screen 106 (FIG. 1) after the user 222 selects a mobile wallet option via, e.g., an associated touch pad, selector button, etc. The display page 230 can include various dialogue boxes, input fields, touch screens and/or general information associated with the mobile wallet option. For example, the display page 230 can include a dialogue box 232 instructing the user 222 to enter her mobile phone number so that the kiosk can transfer (e.g., wirelessly transfer) the value (or at least a portion of the value) of the deposited coins to the user's mobile device or other wireless commerce platform. The user 222 can enter her device phone number via the input device 102 which, in the illustrated embodiment, can include an alpha numeric keypad or touch pad. In some embodiments, the user 222 can enter an e-mail address in an e-mail address field 236, and/or a related password in a password field 238 to automatically retrieve the user's phone number from a corresponding user account accessed via the kiosk 100.

The display page 230 may be implemented in any number of suitable ways known in the art, and can include facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users are shown and described with respect to certain Figures in the present disclosure, those skilled in the relevant art will recognize that various other alternatives may be employed. Moreover, the terms "display page," "web page," "page," "screen shot" and the like are generally used interchangeably herein.

In some embodiments, after providing the kiosk 100 with sufficient information so that the kiosk can wirelessly contact the desired mobile device, the consumer 222 positions the mobile device (e.g., the mobile device 120) in sufficient proximity to the kiosk 100 so that the kiosk 100 can wirelessly transfer the fund information to the mobile device 120 (e.g., to an application program operating on the mobile device that uses a wireless application protocol (WAP) as the underlining technology). In addition or alternatively, the kiosk 100 can include a suitable electrical connector, port, or docking station (e.g., a USB port) to which the mobile device 120 can be temporarily connected or placed so that the kiosk 100 can transfer the fund information to the mobile device 120 via a wired data connection. After the mobile device 120 and/or the kiosk 100 provides a visual, audible, and/or other indication that the funds have been sufficiently transferred to the mobile device 120, the funds can be used to pay for various items or services at technology-enabled retailers, to purchase items on-line, to obtain loyalty program points, and/or to conduct other commercially-related transactions as illustrated in FIG. 2D.

Figure 2D:
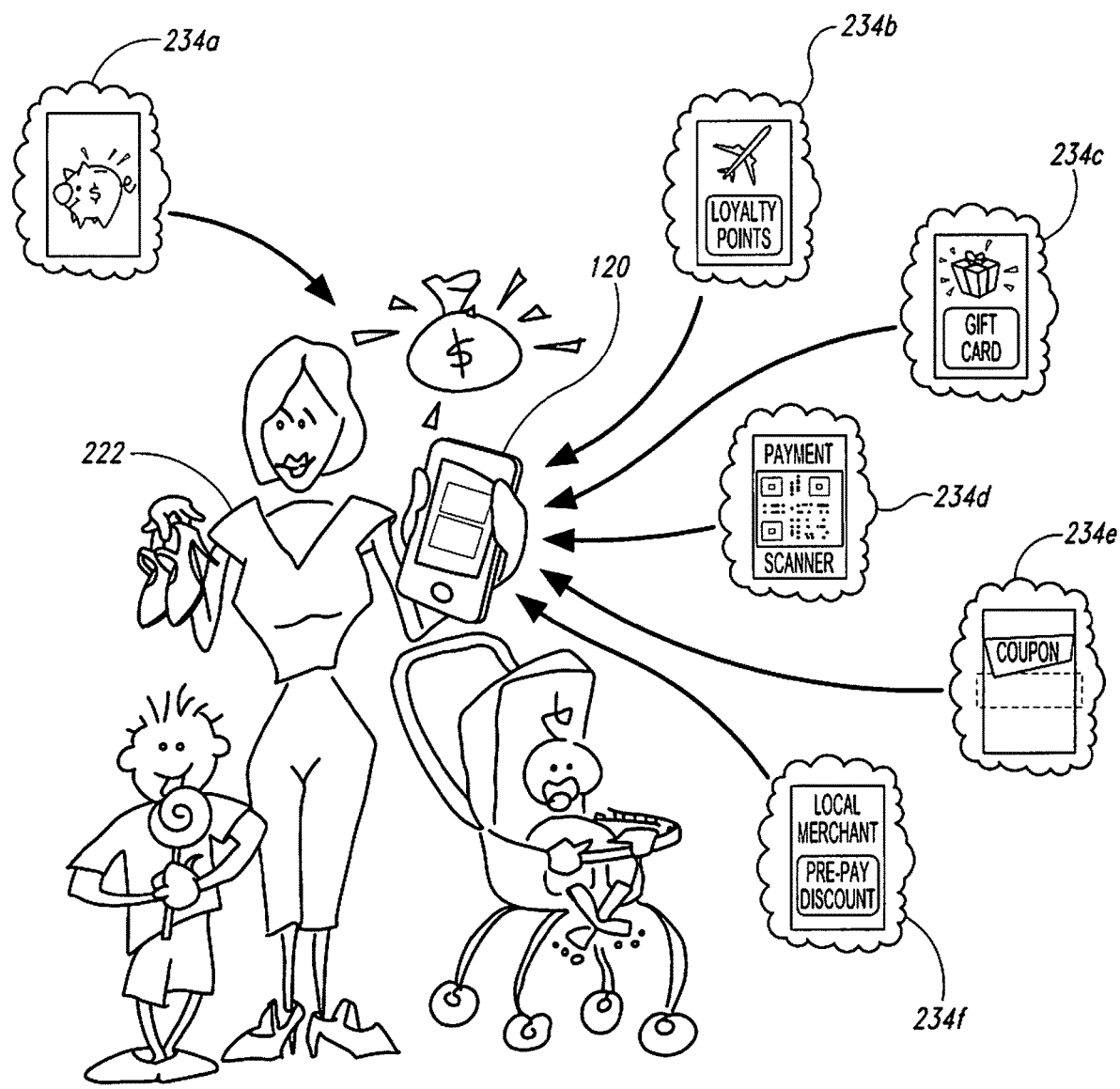

As graphically represented in FIG. 2D, these transactions can include, for example, transferring the funds to an account 234a, such as a prepaid account or savings account, to a loyalty program 234b, either directly or as part of a purchasing program with a specific one or more retailers, and/or to a virtual gift card or mobile wallet 234c. These transactions can also include making wireless payments using a suitable payment scanner or terminal 234d, purchasing or redeeming coupons or "Groupons" 234e, either individually or as part of other purchases, and/or making prepaid purchases from merchants 234f. As those of ordinary skill in the art will appreciate, the various mobile commerce options that become available to the user 222 after her coins have been wirelessly transferred from the kiosk 100 to a mobile commerce platform, such as the mobile device 120, are virtually limitless, and can be easily and quickly configured to accommodate existing and evolving forms of wireless payment.

FIGS. 3A-3F are a series of enlarged front views of the mobile device 120, illustrating various display descriptions or pages 320a-f that can be presented on a display screen 306 (e.g., and LCD screen) to implement various aspects of embodiments of the present disclosure. The display pages 320 may be implemented in any number of suitable ways known in the art, such as in C++ or as web pages in XML (Extensible Markup Language), HTML (HyperText Markup Language), email format, or any other format suitable for displaying information (including character/code-based formats, algorithm-based formats (e.g., vector generated), bit-mapped formats, or any other scripts or methods of creating displayable data, such as the Wireless Access Protocol ("WAP")). As is known, such web pages provide facilities to present information and receive input data, such as a form or page with fields to be filled in, pull-down menus or entries allowing one or more of several options to be selected, buttons, sliders, hypertext links or other known user interface tools for receiving user input. While certain ways of displaying information to users are shown and described with respect to certain Figures in the present disclosure, those skilled in the relevant art will recognize that various other alternatives may be employed.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. In general, a "link" refers to any resource locator identifying a resource on a network, such as a display description provided by an organization having a site or node on the network. The terms "page," "display page," "display description," "web page," "screen shot" and the like are generally used interchangeably herein, and generally refer to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

Referring first to FIG. 3A, the display page 320a includes a virtual gift card 340a (in this case, a multi-merchant card) that the user can select to receive all or a portion of the funds deposited into the kiosk 100. The display page 320a can also provide various information fields 344 that can tell the consumer when, for example, they receive "mobile money," or provide the consumer with customer support information, etc. In addition, in some embodiments the display page 320a can include a selector button or icon 342 that the user can select (by, e.g., touch or click with a suitable pointing device) to select one or more virtual gift cards. For example, selecting the icon 342 can bring up the display page shown in FIG. 3B.

In FIG. 3B, the display page 320b depicts a plurality of additional virtual gift card options 340b-m. While only 12 branded retailer options are depicted in FIG. 3B, additional options can be presented on one or more following display pages. The display page 320b also includes an input field 346 in which the user can specify how much of the funds they would like to have placed on a particular gift card.

Figure 3F:
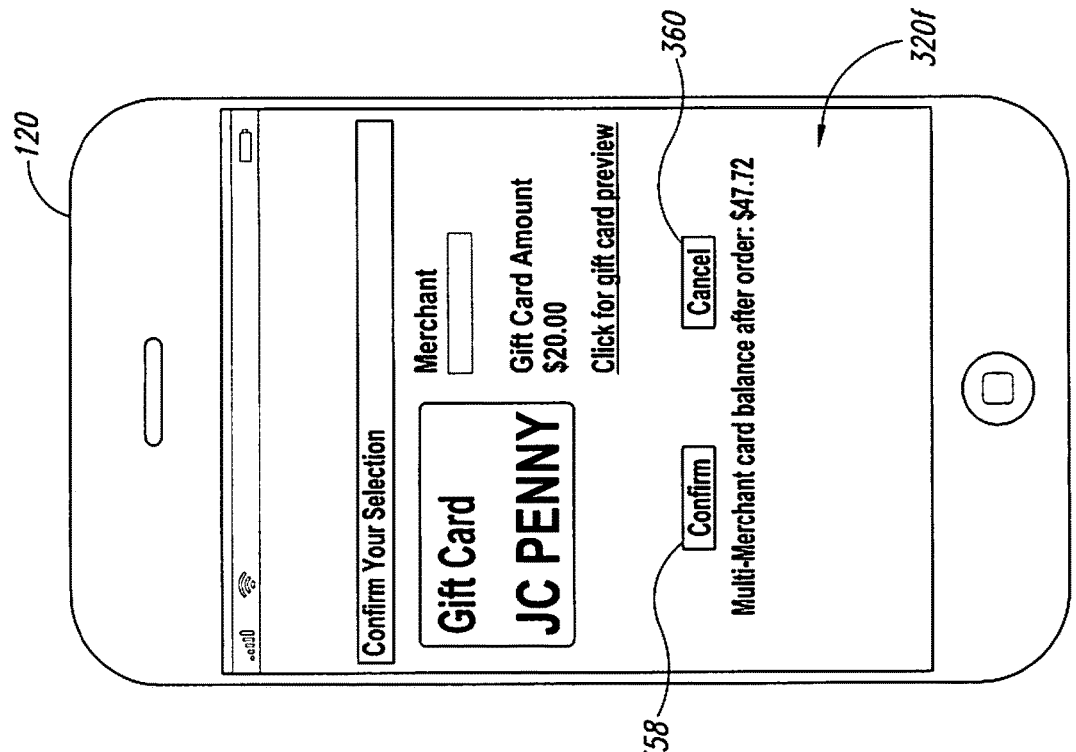
Figure 3E:
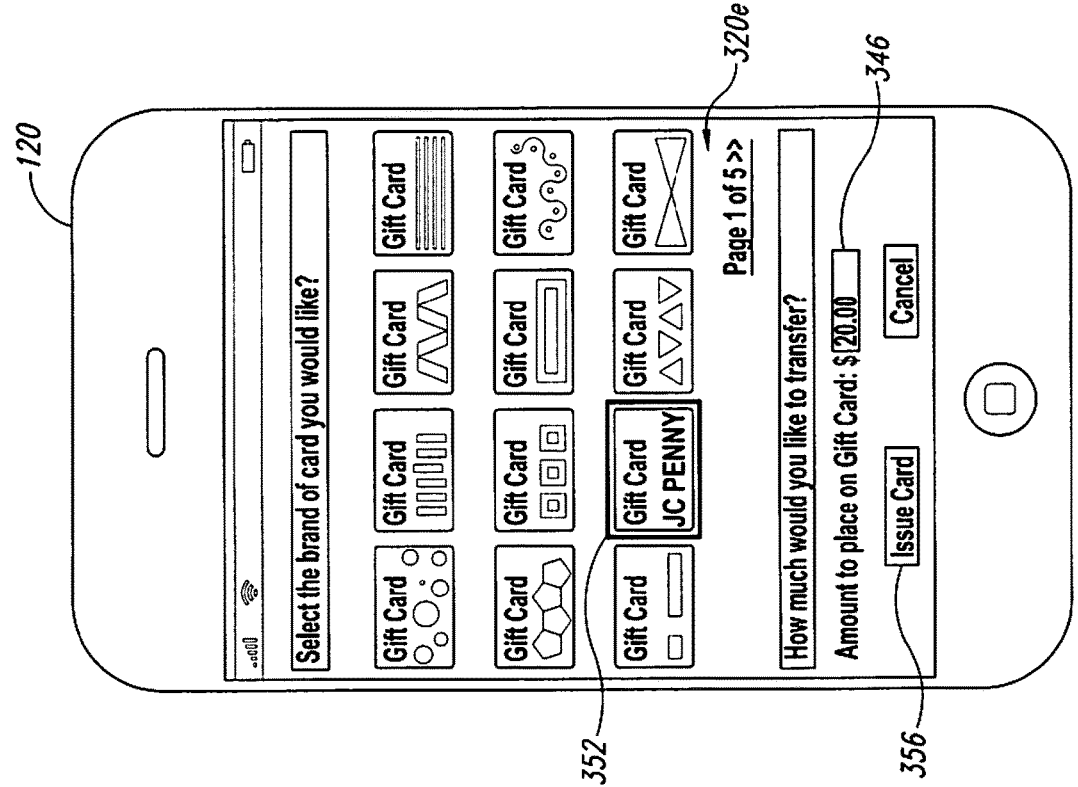

As shown in FIG. 3C, the display page 320c can include a promotions field 348. Selecting one of the displayed promotions brings up the associated display page 320d shown in FIG. 3D, which provides additional information about the promotion. FIG. 3E illustrates the display page 320e after the user has selected one of the virtual gift cards (e.g., a JCPenny™ gift card 352) and input the desired amount of funds (e.g., $20) in an amount field 346. After selecting the card and inputting the desired value, the user can click or otherwise select an issue card icon or button 356 which, in some embodiments, can bring up the display page 320f illustrated in FIG. 3F. The display page 320f displays the selected virtual gift card and card amount, and requests that the user either confirm the selection with a confirm button 358, or cancel the selection with a cancel button 360.

Figure 4:
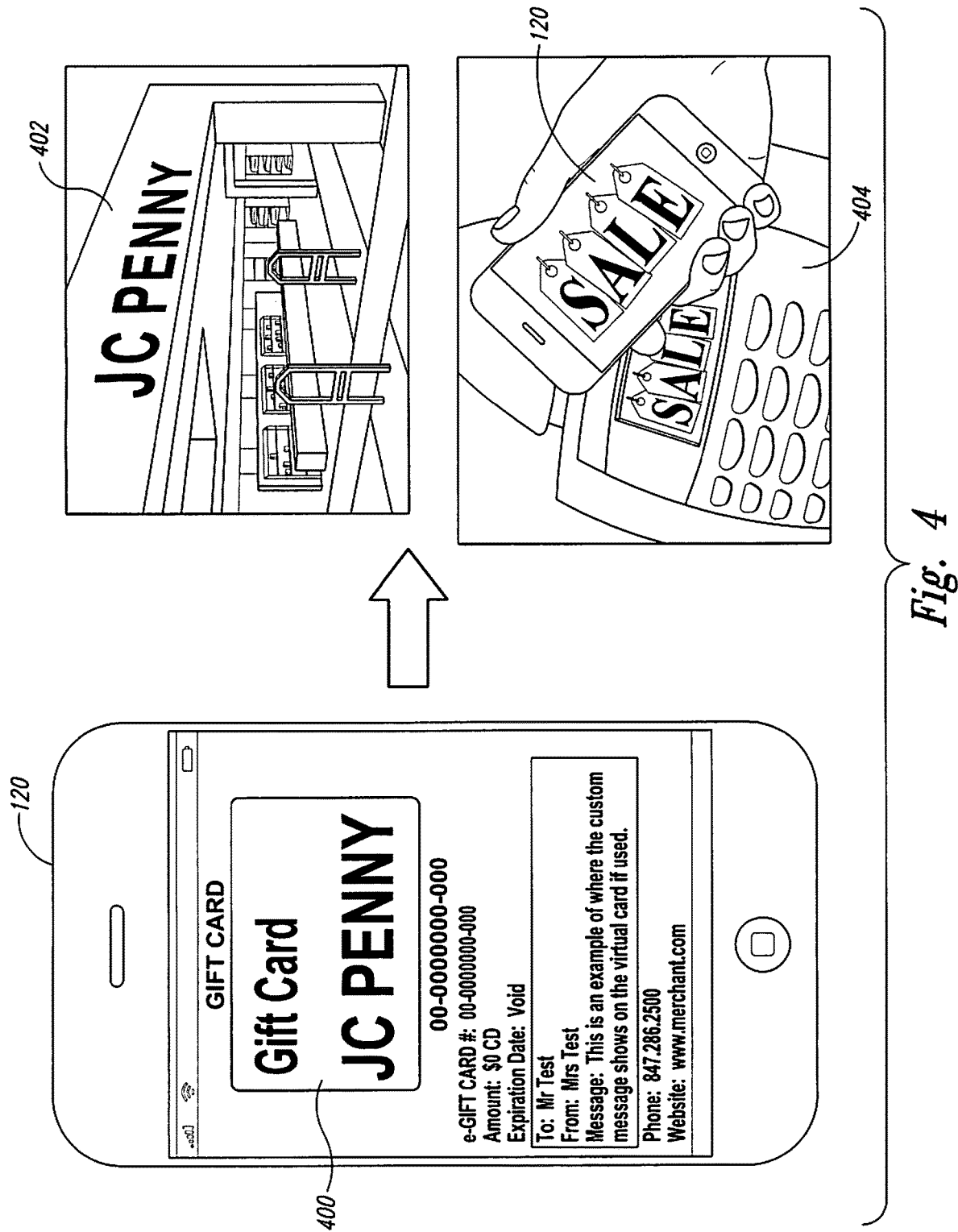
FIG. 4 is a schematic diagram illustrating various steps for making a purchase with a virtual gift card in accordance with embodiments of the present disclosure.

FIG. 4 is a schematic representation illustrating various aspects of a method of using the virtual gift card selected in FIG. 3F. More specifically, in the illustrated embodiment the consumer merely selects the appropriate icon 400 on the mobile device 120 and places the device in the near field of a POS terminal 404 having suitable wireless technology (e.g., a suitable wireless reader module) to perform the desired purchase transaction at the branded retailer 402. The transaction may require authentication (e.g., by entering a password, PIN, and/or other identifiers) or it may not.

Figure 5:
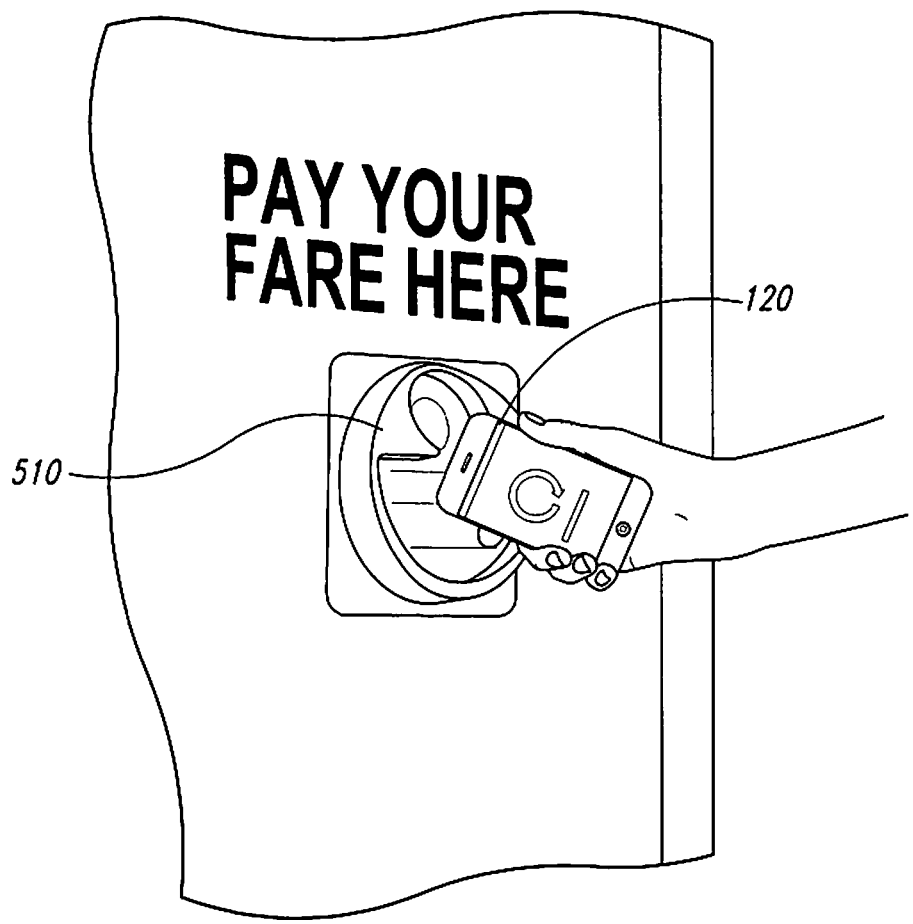
FIG. 5 is a schematic diagram illustrating various aspects of another method for making a purchase with a virtual gift card in accordance with embodiments of the present disclosure.

FIG. 5 illustrates aspects of another method for purchasing a product, service, etc. with the mobile device 120 in accordance with an embodiment of the present disclosure. In this embodiment, rather than using the mobile device 120 to wirelessly pay for a selected good or service at a retail outlet or other merchant, the user simply places the device 120 in the proximity of an automated kiosk terminal 510 to wirelessly pay for, e.g., a fare on, for example, a subway, bus, train, etc. Similar procedures can be employed to purchase or rent other items from other types of automated machines, including vending machines, gaming machines, DVD rental kiosks, etc.

Figure 6:
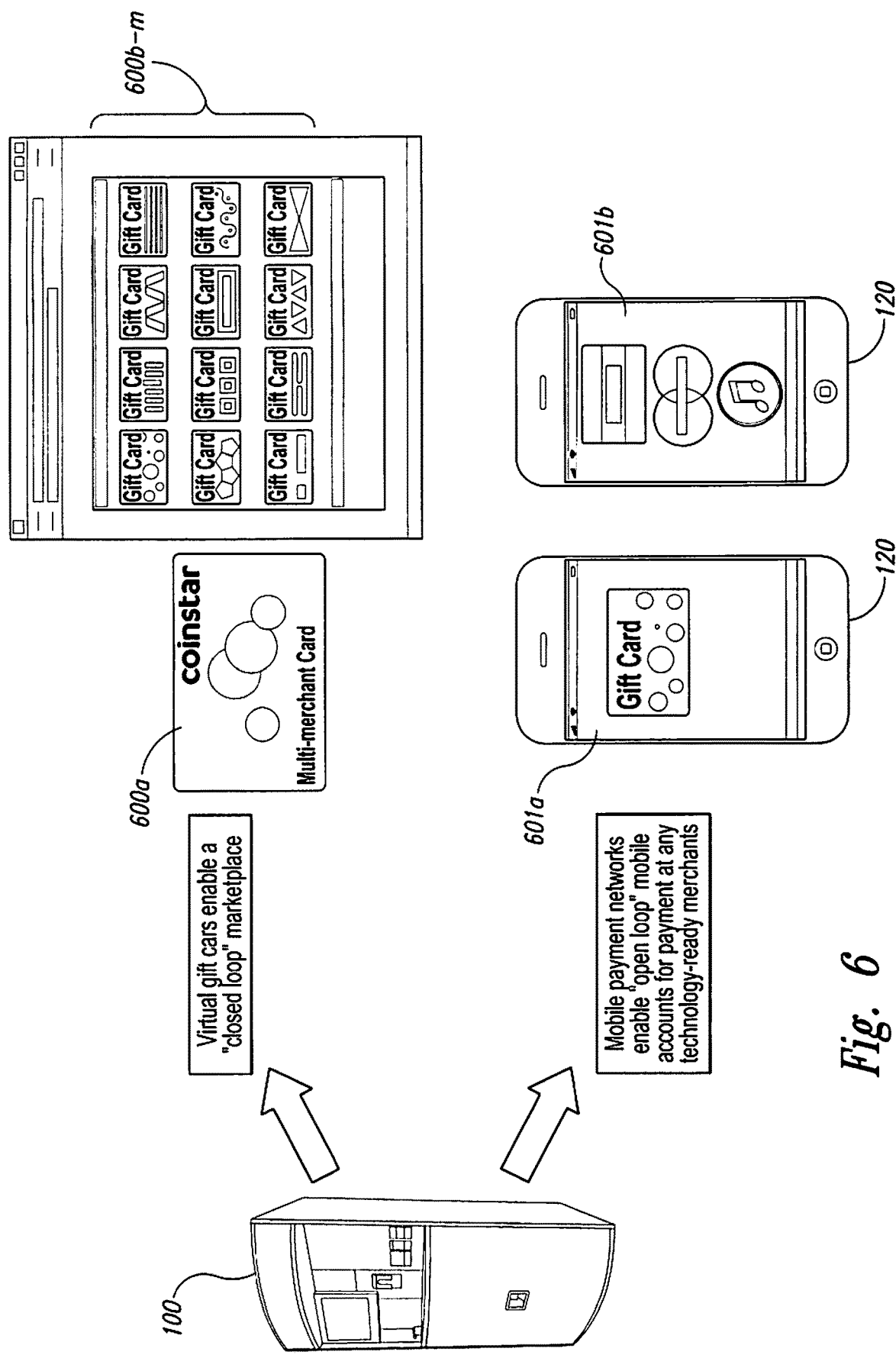
FIG. 6 is a schematic diagram illustrating various aspects of different purchasing platforms implemented in accordance with embodiments of the present disclosure.

FIG. 6 is a schematic diagram illustrating various aspects of closed loop payment platforms and open-loop payment platforms that may be implemented in accordance with embodiments of the present disclosure. In some embodiments, the kiosk 100 can transfer coin, cash and/or other forms of value to virtual gift cards for use in a closed loop marketplace. As discussed above, this could involve the user selecting from one or more branded virtual gift cards 600a-m which can then be used to make wireless purchases from one or more specified merchants. In other embodiments, the kiosk 100 can transfer funds to an open-loop platform on a mobile device for use at any merchant equipped with suitable payment technology (e.g., a near field reader, etc.). Such open-loop mobile platforms can include, for example, Google Wallet which can facilitate wireless purchases with a virtual Google gift card 601a, a virtual Visa gift card 601b, and/or other such accounts displayed on the mobile device 120.

Figure 7:
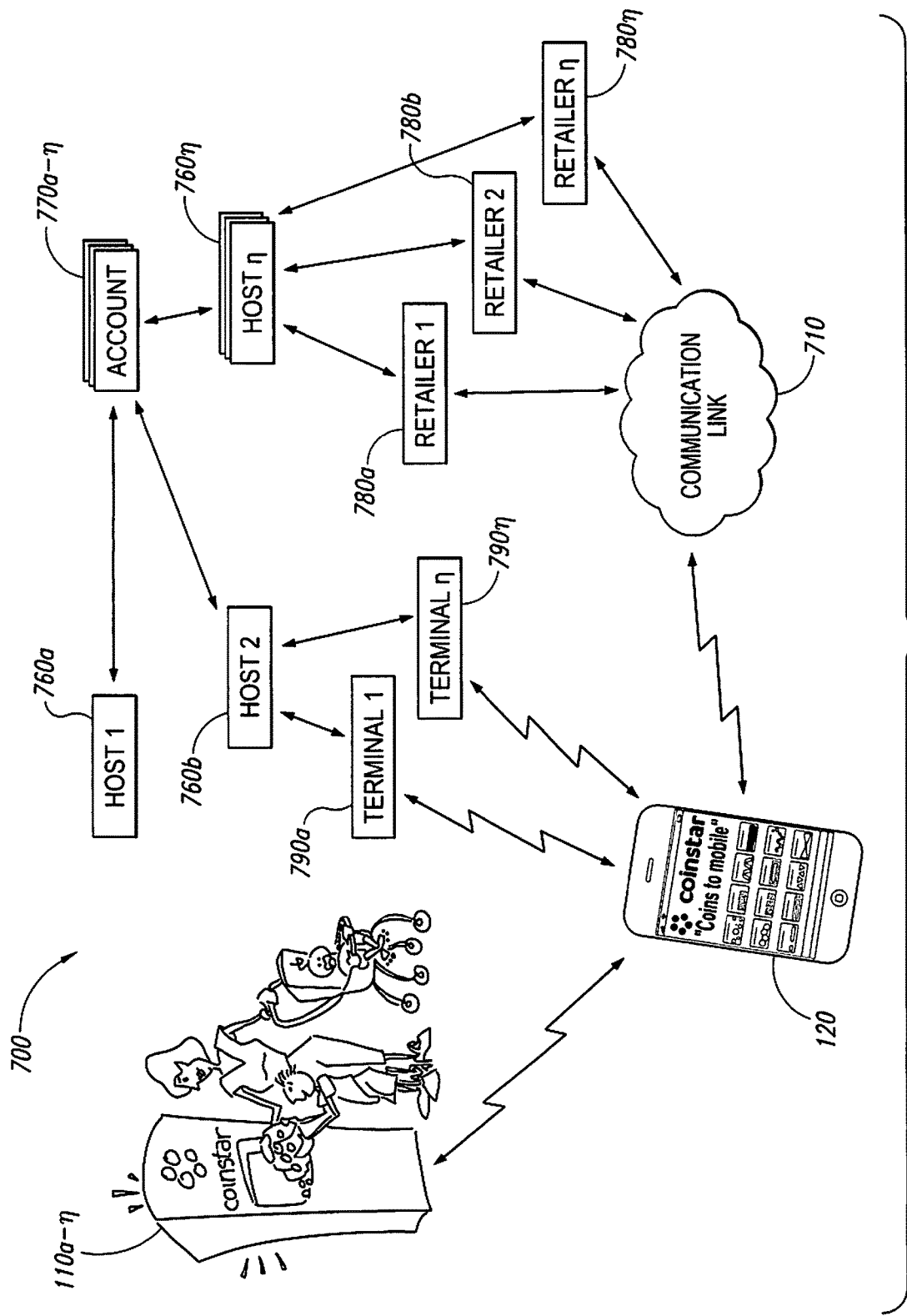
FIG. 7 is a schematic diagram of a suitable network environment for implementing various aspects of embodiments of the present disclosure.

FIG. 7 is a schematic diagram of a suitable network computing environment for implementing various aspects of a mobile commerce system 700 in accordance with embodiments of the present disclosure. In the illustrated embodiment, one or more consumer kiosks 100a-η (e.g., consumer coin counting kiosks) can be operably connected to a first host computer 760a via one or more communication links known in the art. Such links can include, for example, a modem, cable connections, wireless connections, etc. In the illustrated embodiment, the first host computer 760a can include a suitably configured server computer for exchanging information with the network of kiosks 100 and one or more accounts 770a-η. The accounts 770 can include various types of computer-implemented financial accounts (e.g., banking accounts), commercial accounts, gift card accounts, etc. that keep track of the balance of funds in a particular account (e.g., a closed loop or open loop mobile account) in response to debits and credits against the account. The accounts 770 may be managed by any number of membership organizations, banks, credit unions, or financial institutions. In accordance with embodiments of the present disclosure, the accounts 770 can be implemented by a variety of methods, protocols, and systems including, for example, an automated clearing house (ACH) network, an Electronic Payments Network (EPN), and other banking networks, such as CIRRUS, NYCE, and the like. Similar "back-end" accounting systems are well known to those of ordinary skill in the art for reconciling activation, use, and/or reloading of myriad types of payment instruments, and can be implemented by one or more processing devices operably communicating with one or more databases.

In another aspect of this embodiment, each of the kiosks 100a-η can include wireless technology suitable for wireless communication between the kiosks and any number of different mobile devices, such as the mobile device 120 (e.g., a smart phone, mobile phone, tablet computer, PDA, netbook, transportable computer, etc.). For example, the kiosks 100 may connect to the mobile device 120 and/or other portions of the network directly or through other devices or connections including routers, modems, hubs, Wi-Fi connections, Wireless Personal Area Networks (WPANs), Wi-Fi PANs, wireless local area networks (WLAN), Global System for Mobile Communications (GSM), Personal Communications Service (PCS), as well as other suitable communication technology and systems known in the art.

The mobile device 120 can also be selectively linked to one or more of the accounts 770 via one or more POS terminals 790a-790η when the consumer desires to make a purchase at a terminal-enabled POS. The terminals 790 can include, for example, various types of wireless technology POS terminals that can accommodate mobile account purchases located at a wide variety of retailers and merchants. In operation, the individual terminals 790 can receive wireless payment information from the mobile device 120, and provide related information (e.g., an account number, code or other information identifying the associated mobile account; the total cost of purchased item(s) and/or service(s), etc.) to a corresponding second host 760b (which can comprise one or more computers), which in turn exchanges related information with the appropriate account 770 to, e.g., debit the account in accordance with the particular purchase. After the account is debited, the account 770 transmits corresponding information back to the mobile device 120 (and/or other portions of the network) so that the mobile payment application on the device 120 can be updated to reflect the new amount of funds remaining in the corresponding mobile account.

In various embodiments, the mobile device 120 can further include the capability to communicate (e.g., wirelessly communicate) with individual retailers and merchants 780a-780n via a suitable communications link, such as the Internet, or other communication link such as a direct wireless communication link. More specifically, in some embodiments the mobile device 120 can remotely transmit information associated with a virtual gift card purchase to one of the retailers 780, to enable the consumer to make a purchase from, for example, a retailer website or from an actual POS at a retailer outlet. The information transmitted to the retailer 780 can include, for example, the amount of the purchase transaction, and an authentication code or other identifier associated with the virtual gift card. This information can then be transmitted to the appropriate account 770 via a third host 760n. As with the host computers 760a, b, the third host 760n may also comprise one or more computers or a network of computers. As with the open loop option, once the account 770 has been suitably debited in accordance with the desired purchase, the remaining account balance is transmitted back to the mobile device 120 so that the application running on the device 120 can store the current account balance.

Those of ordinary skill in the art will appreciate that various aspects of the illustrated technology can be practiced with other communications, data processing, or computer system configurations including, for example, Internet appliances, handheld devices (including PDAs), wearable computers, all manner of cellular or mobile phones (including Voice over IP (VoIP) phones), dumb terminals, media players, gaming devices, multi-processor systems, multi-processor based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

As those of ordinary skill in the art will also appreciate, the network system 700 provides an overview of various aspects of a mobile commerce system for implementing wireless purchase transactions from a mobile device in accordance with embodiments of the present technology. In other embodiments, the system 700 or similar systems for implementing mobile commerce can include more or fewer elements and/or features, or different elements and/or features than those described above. Accordingly, FIG. 7 is presented as an illustration of certain embodiments to give the reader a general understanding of the framework for implementing the present disclosure. But the present disclosure is not limited to this particular embodiment.

Those skilled in the relevant art will further appreciate that various concepts and portions of the mobile commerce system 700 can be implemented in environments other than the Internet. For example, the concepts can be used in an electronic mail environment in which electronic mail forms and messages perform various aspects of the mobile commerce system 700. Also, various communication channels may be used, such as a local area network, wide area network, or a point-to-point dial-up connection instead of the Internet.

Figure 8:
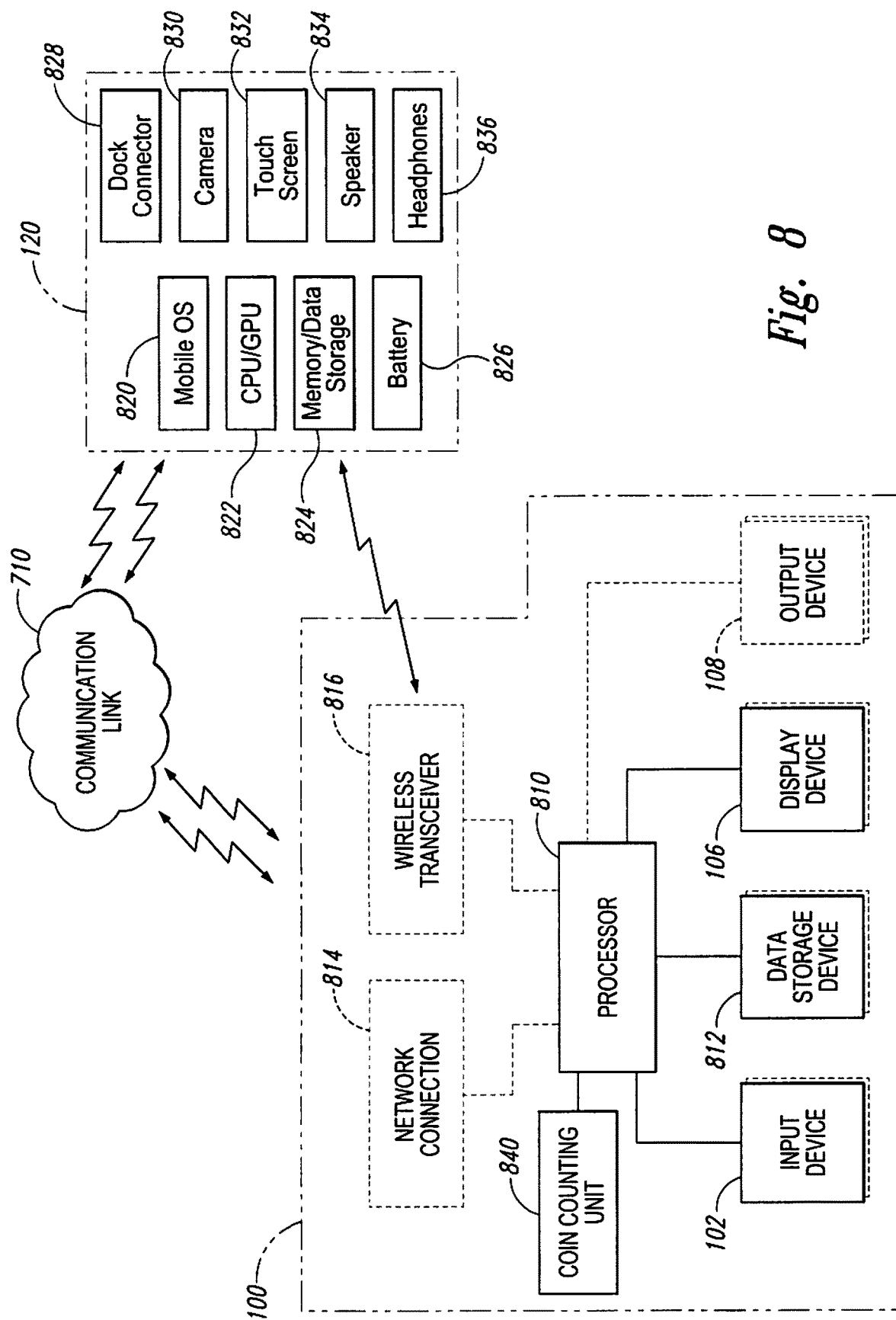
FIG. 8 is a schematic diagram illustrating various aspects of consumer operated kiosks and wireless mobile devices suitable for implementing various financial transactions in accordance with embodiments of the present disclosure.

FIG. 8 provides schematic representations of the architecture of the kiosk 100 and the mobile device 120 in accordance with embodiments of the present disclosure. In the illustrated embodiments, the kiosk 100 can include a suitable network connection 814 (e.g., a wired connection, such as a modem, cable, etc.), and a wireless transceiver 816, such as a transceiver suitable for wireless near field communication (e.g., Bluetooth communication) with the mobile device 120. The kiosk 100 can further include a suitable processor or central processing unit (CPU) 810 that controls one or more functions of the kiosk 100, including receiving information from a coin counting unit 840, a consumer input device 102 (e.g., a touch screen, key pad, etc.), a data storage device or memory 812, a display device 106 (e.g., a LCD screen), and/or a suitable output device 108 (e.g., a visual and/or audio output device such as a display screen and speakers, respectively, a tactile output device for dispensing, for example, redeemable paper vouchers, receipts, e-certificates, card facsimiles (e.g., wallet-sized prepaid cards), etc.) The CPU 810 may be any logic processing unit, such as one or more CPUs, digital signal processors (DSPs), application-specific integrated circuits (ASIC), etc. The system memory 812 can include read-only memory ("ROM") and random access memory ("RAM").

In some embodiments, the mobile device 120 can include one or more features, applications, and/or other elements commonly found in smart phones and other known mobile devices. For example, the mobile device 120 can include a central processing unit (CPU and/or graphics processing unit (GPU), for executing computer readable instructions stored on memory 824. In addition, the mobile device 120 can include an internal power source or battery 826, a dock connector 828, a camera 830, and/or well known input devices 832 including, for example, a touch screen, a keypad, etc. In many embodiments, the mobile device 120 includes a headphone connection 836, and a speaker 834 for two way communication and audio playback. In addition to the foregoing features, the mobile device 120 can also include a mobile operating system (OS) 820 for wirelessly communicating with, for example, other mobile devices, websites, and the kiosk 100. Such communication can be performed via the communication link 710, which can include, for example, the Internet, an intranet, cell towers, the plain old telephone system (POTS), etc.

Unless described otherwise, the construction and operation of the various blocks shown in FIG. 8 are of conventional design. As a result, such blocks need not be described in further detail herein, as they will be readily understood by those skilled in the relevant art. In other embodiments, the kiosk 100 and/or the mobile device 120 can include other features that are different from those described in detail above. In still further embodiments, the kiosk 100 and/or the mobile device 120 can include more or fewer features similar to those described above.

Figure 9:
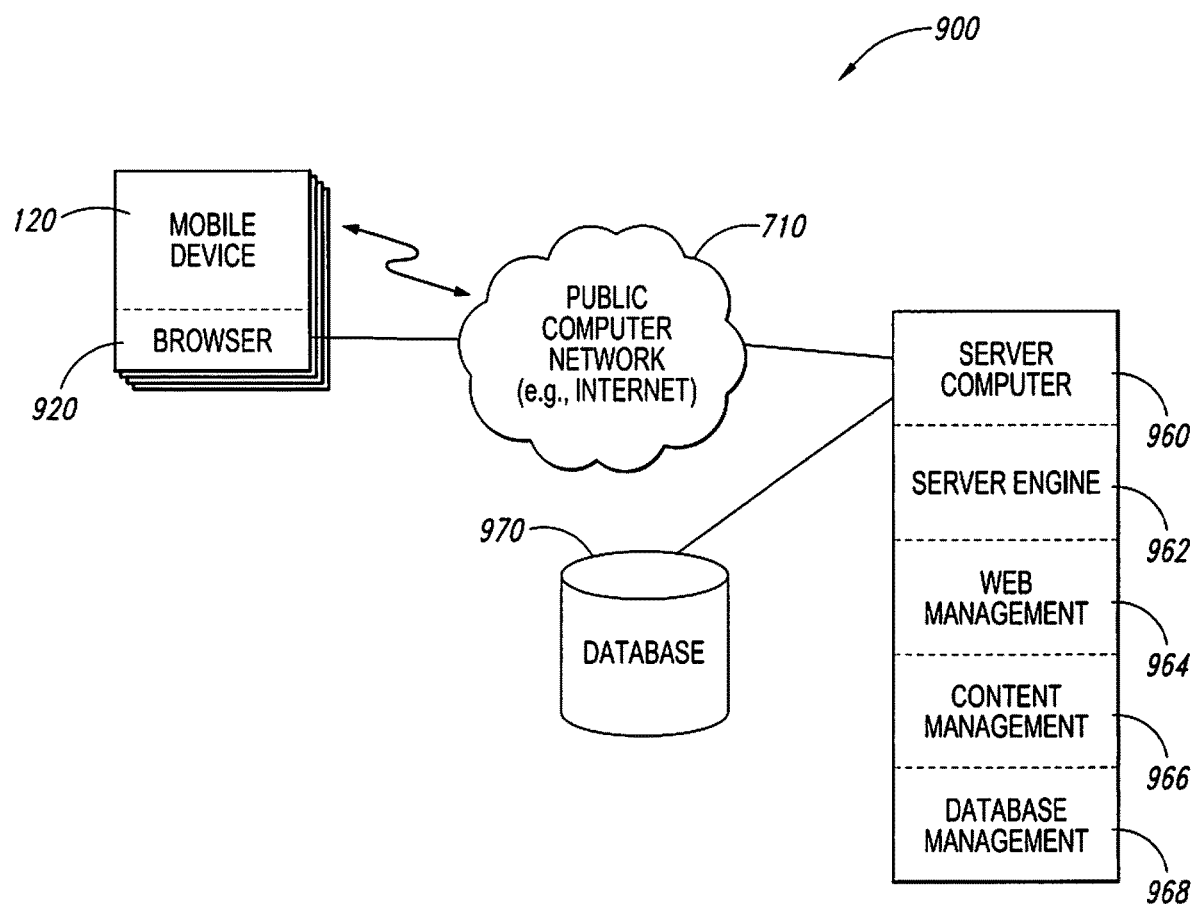
FIG. 9 is a schematic diagram of a distributed computing environment suitable for performing various operations for implementing embodiments of the present disclosure.

FIG. 9 is a schematic diagram of a suitable computing environment in which various aspects of the mobile commerce platforms described above can be implemented in accordance with embodiments of the present disclosure. The computing environment 900 has a web interface that includes one or more mobile devices 120, each of which includes a browser program module 920 that permits the mobile device to access and exchange data with the communication link 710 (e.g., the Internet). As discussed above, the mobile device 120 may include one or more central processing units or other logic-processing circuitry, memory, input devices (e.g., keyboards, touch pads, etc.), output devices (e.g., display devices), and storage devices. The mobile device 120 can be operably connected to one or more server computers 960 via the communication link 710. The server computers 960 can perform much or all of the functions for receiving, routing and storing of electronic messages, such as web pages, audio signals and electronic images necessary to implement the mobile commerce systems described above.

Although a publicly available communication link 710 (e.g., the Internet) is shown in FIG. 9, a private network, such as an intranet may likewise be used. The server computer 960 can retrieve and exchange web pages and other content with a database 970. In addition, in various embodiments, the server computer 960 can include a server engine 962, a web page management component 964, a content management component 966, and a database management component 968. In various embodiments, the server engine 962 can perform the basic processing and operating system level tasks associated with the various technologies described herein. The web page management component 964 can handle creation and/or display and/or routing of web or other display pages. As is known, users may access the server computer 960 via the mobile device 120 by either keying in or otherwise inputting a URL associated with the server computer. The content management component 966 can handle many of the functions in the mobile commerce embodiments described herein. The database management component 968 can include suitable storage and can perform suitable storage and retrieval tasks with respect to the database, query the database, and store various data such as animation, graphics, visual and audio signals, etc.

Figure 10:
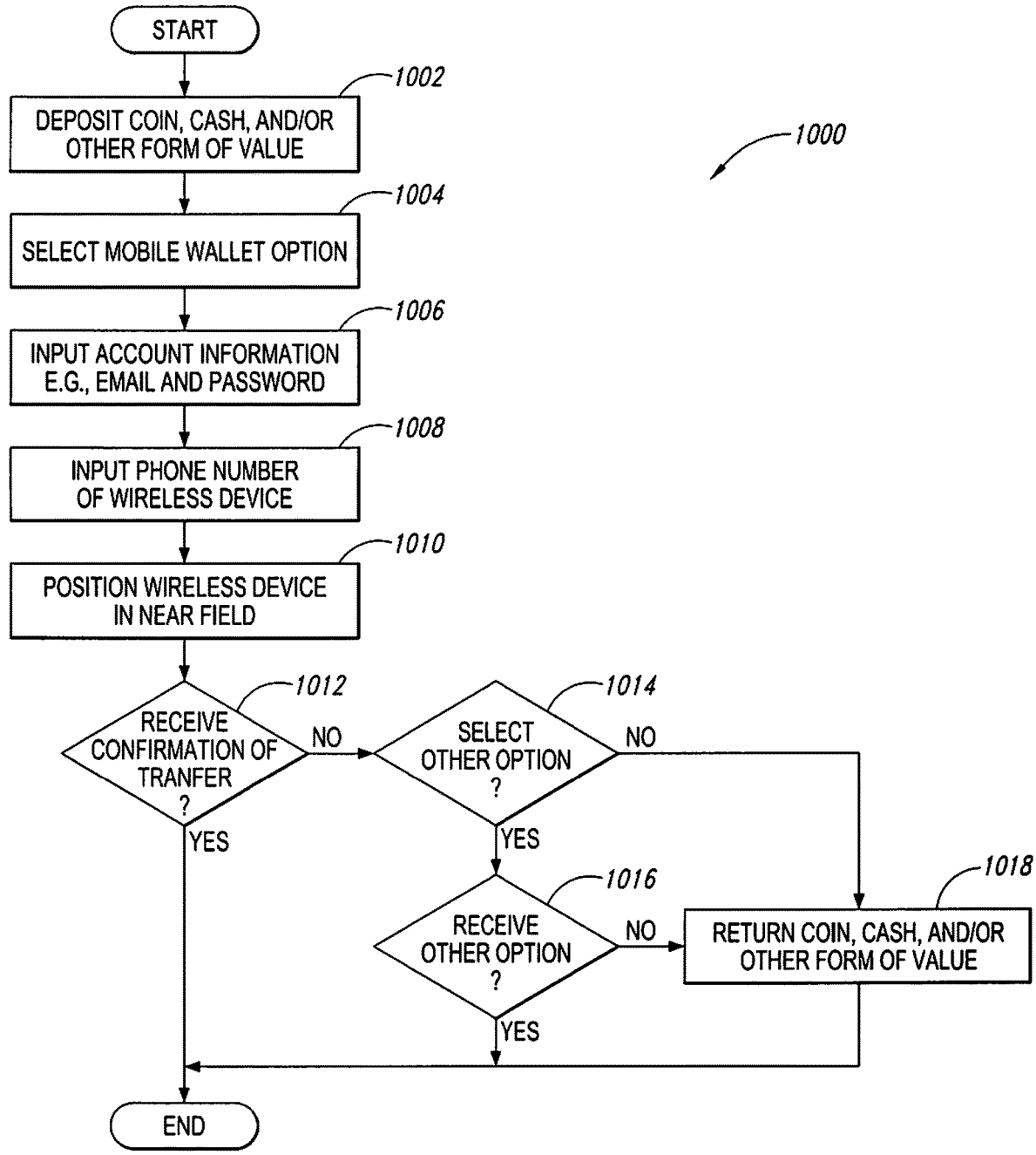
FIG. 10 is a flow diagram of a routine for transferring coins, cash, and/or other forms of value to a mobile commerce platform in accordance with embodiments of the present disclosure.

FIG. 10 is a representative flow diagram of a routine 1000 for transferring coin value, cash value, and/or other forms of value to a mobile commerce platform in accordance with an embodiment of the present disclosure. This flow diagram and the ones that follow herein do not show all functions or exchanges of data, but instead they provide an understanding of commands and data exchanged under various embodiments of the methods and systems described above. Those skilled in the relevant art will recognize that some functions or exchange of commands and data may be repeated, varied, omitted, or supplemented, and other (less important) aspects not shown may be readily implemented.

Those of ordinary skill in the art will appreciate that the routine 1000 and other functions and methods described herein can be implemented as an application specific integrated circuit (ASIC), by a digital signal processing (DSP) integrated circuit, through conventional programmed logic arrays and/or circuit elements. While many of the embodiments may be implemented in hardware (e.g., one or more integrated circuits designed specifically for a task), such embodiments could equally be implemented in software and be performed by one or more processors. Such software can be stored on any suitable computer-readable medium, such as microcode stored in a semiconductor chip, on a computer-readable disk, or downloaded from a server and stored locally at a client.

Some steps depicted in FIG. 10 and the flow diagrams that follow are of a type well known in the art, and can themselves include a sequence of operations that need not be described herein. Those or ordinary skill in the art can create source code, microcode, program logic arrays or otherwise implement the invention based on the flowcharts and the detailed description provided herein. In some embodiments, all or a portion of the routine 1000 can be implemented by a consumer operating one or more of the devices and systems described in detail above. In block 1002, for example, the routine begins when the consumer or other user deposits coins, cash and/or other forms of value (e.g., credit, debit, paper vouchers, account transfers, loyalty points, tokens, etc.) into a consumer operated kiosk (e.g., the kiosk 100 of FIG. 1) or other suitable machine for counting the deposited funds to determine a value.

In block 1004, the user reviews one or more options (presented on, e.g. the display 106 of the kiosk 100) for converting the deposited funds into other forms of value. The options can include, for example, receiving a redeemable cash voucher, receiving an e-certificate, receiving a prepaid card, and/or having all or a portion of the funds transferred to a mobile wallet account. In the illustrated embodiment, the consumer selects the mobile wallet option in block 1004. In block 1006, if the user has an existing account (e.g., a loyalty account or other account with, for example, the kiosk operator), the user may wish to input information identifying the existing account, such as an e-mail address and password, to bring up user information needed to facilitate the transaction without having the user manually input the information, and/or to maintain the consumer's use history and provide promotions and incentives to the user based on prior use history.

In block 1008, the user inputs an electronic identifier (e.g., a phone number, IP address, etc.) of the wireless device to which they wish to have the funds transferred. In block 1010, the user positions their wireless device within sufficient proximity of the kiosk so that the kiosk can wirelessly transfer the designated funds to the consumer's mobile wallet account. In some embodiments, this can include launching a mobile account application on the mobile device 120 that includes, for example, a software application that resides on the mobile device, is accessed over a network, and/or is accessed via a web page, etc. Such and application may be received by the mobile device 120 via, for example, a communication, such as a text message, email, or advertisement on a web page or one of the kiosks 100. The communication may contain a link to, e.g., a website where the consumer may download the mobile account application.

In decision block 1012, the routine checks for confirmation that the funds were transferred from the consumer-operated kiosk to the consumer's wireless device. After receiving confirmation that the funds were wirelessly transferred from the consumer-operated kiosk to the consumer's wireless device, the routine ends. If for any reason the transfer did not go through, the routine proceeds to block 1014 to check if the consumer has selected another option for use of the deposited funds. If the consumer has not selected another option, the routine proceeds to block 1018 and the kiosk returns the funds to the consumer. If instead the consumer does select another option, then the routine proceeds to decision block 1016 to confirm that the consumer did in fact receive the other selected option (e.g., a redeemable cash voucher, prepaid card, e-certificate, etc.). If the consumer receives confirmation of the other option, then the routine ends. If not, the funds are returned to the consumer in block 1018 and then the routine ends.

Figure 11:
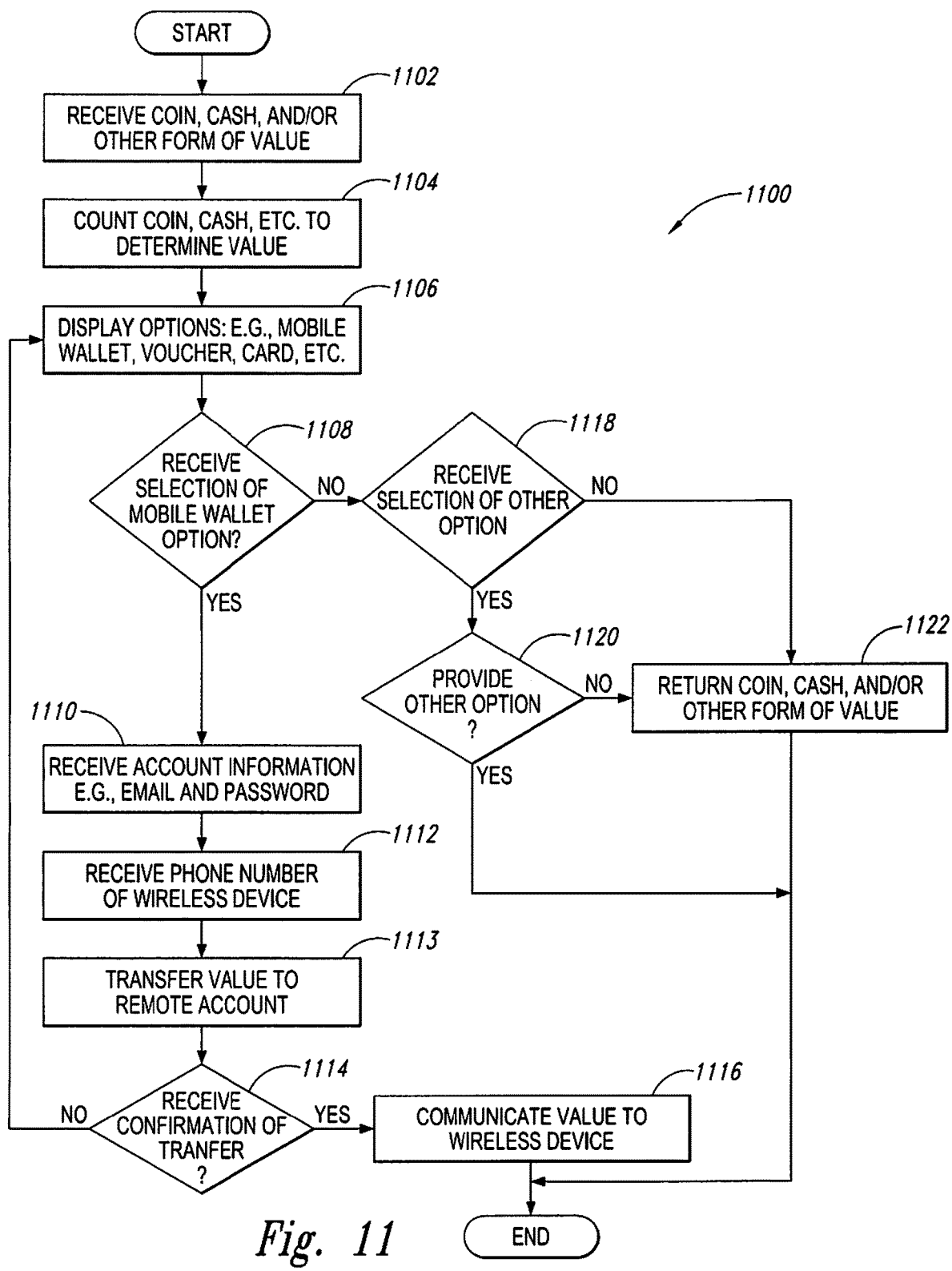
FIG. 11 is a flow diagram of a machine-implemented routine for converting coins, cash, and/or other forms of value to a mobile commerce platform in accordance with other embodiments of the present disclosure.

FIG. 11 is a flow diagram of a machined-implemented routine 1100 for transferring funds received from a consumer to a mobile device for use in a mobile commerce platform in accordance with embodiments of the present disclosure. In some embodiments the routine 1100 can be stored in non-volatile memory in the kiosk 100, or can be stored in removable media, such as disks, or hardwired or preprogrammed in chips, such as EEPROM semiconductor chips. In block 1102, the routine begins when the machine (e.g., a consumer-operated coin counting kiosk) receives coin, cash and/or other forms of value from a consumer. In block 1104, the routine counts the received funds to determine a value. In block 1106, the routine displays (e.g., via the display 106 on the kiosk 100 of FIG. 1) one or more options to the consumer for allocating the value of the received funds. The options can include, for example, receiving a redeemable voucher, a prepaid card, and/or having all or a portion of the funds transferred to a mobile wallet account.

In decision block 1108, the routine determines if the consumer selects the mobile wallet option. If so, the routine proceeds to block 1110 and optionally receives account information (e.g., an e-mail address and password) associated with an existing account containing transaction history, preferences and other information about the consumer's past use of the kiosk network. In some embodiments, step 1110 can be omitted or optional. In block 1112, the routine receives a phone number or other identifier from the consumer sufficient for the kiosk to communicate with the wireless device.

In block 1113, the routine transfers the deposited value to a remote account (e.g., one or more of the accounts 770 of FIG. 7) for implementing and reconciling the mobile commerce routines described above. In decision block 1114, the routine confirms that the funds were adequately transferred to the remote account. If for any reason the kiosk was unable to transfer the consumer's funds to the remote account, then the routine returns to the block 1106 and informs the consumer of this and displays additional options for application of the consumer's funds. Conversely, if the funds received from the consumer were properly transferred to the remote account and the remote account (or one or more computers associated therewith) transmits a confirmation communication back to the kiosk, then the routine proceeds to block 1116 and communicates (e.g., wirelessly communicates) the selected value of the consumer's funds to the consumer's wireless device. In some embodiments, this step requires the user to position their wireless device within a certain proximity of the consumer-operated kiosk. After the funds have been successfully transferred to the consumer's mobile device, the routine ends.

Returning to decision block 1108, if the consumer does not select the mobile wallet option, then the routine proceeds to decision block 1118 to determine if the consumer has selected one or more of the other options. If not, then the routine proceeds to block 1122 and returns the deposited funds to the consumer. Conversely, if the consumer does select one or more of the other options, then the routine proceeds to decision block 1120 to provide the selected option to the consumer. If the routine provides the newly selected option, then the routine ends. Conversely, if for whatever reason the machine is unable to provide the newly selected option, then the routine proceeds to block 1122 and returns the funds to the consumer, after which the routine ends.

FIGS. 12A-12C are a series of flow diagrams illustrating flow routines 1200*a-c*, respectively, for purchasing goods and/or services in accordance with various embodiments of the mobile commerce technology described above. Referring first to FIG. 12A, the routine 1200*a* begins in block 1202*a* when the consumer identifies the goods and/or services the consumer wishes to purchase at a POS in, e.g., a retail location having a POS terminal equipped with a wireless reader configured for conducting wireless commerce. In this embodiment, identifying the goods and/or services can include the consumer simply placing the selected goods on the counter at the POS, scanning the goods, etc. As discussed above, the wireless reader can include one or more different types of wireless payment terminals that can wirelessly communicate with a mobile device that is waved, tapped, or otherwise placed in close proximity to the terminal. In block 1204*a*, the consumer positions their mobile device (e.g., their smart phone) within a suitable proximity to the wireless reader. In block 1206*a*, the terminal and/or the consumer's mobile device may, in some embodiments, require the consumer to enter some form of authentication to complete the commercial transaction. Such authentication can include a unique code or PIN, a password, etc. After block 1206*a*, the routine 1200*a* ends.

Referring next to FIG. 12B, in some embodiments the routine 1200*b* can be implemented to purchase goods and services from an e-commerce website with a virtual gift card. In block 1202*b*, the routine begins when the consumer selects a mobile billing option to pay for a selected item or service on an e-commerce website. After selecting this option, in block 1204*b* the consumer selects or otherwise identifies an appropriate virtual gift card, mobile account, etc., with which to transfer funds for payment of the selected item. In various embodiments, the user can identify such payment instrument in response to, for example, a corresponding prompt on the website. In block 1206*b*, the consumer can enter appropriate authentication to complete the transaction, if required by the particular e-commerce website, and then the routine ends.

Referring next to FIG. 12C, in various embodiments the routine 1200*c* can be implemented by a consumer wishing to purchase goods and/or services from an e-commerce website or web page using an open loop mobile payment account. In block 1202*c*, the consumer opens an application or web page on, for example, their mobile device, such as a smart phone. In block 1204*c*, the consumer identifies the goods and/or services they wish to purchase from the website. In block 1206*c*, the user indicates via the website that they wish to pay for the selected goods and/or services using a mobile payment account. As discussed in detail above, such an account can be associated with an open loop virtual card that can be used at a number of different retailers that are equipped with the suitable commerce technology, much in the way that a conventional credit card can be used at a wide variety of retail establishments. In block 1208c, the consumer identifies the mobile account that they wish to use to pay for the selected goods and/or services. As with the routines 1200a and 1200b discussed above, the routine 1200c can also require the user to enter some form of authentication to complete the transaction. After block 1210c, the routine ends.

As the foregoing disclosure illustrates, there are a number of different ways that a consumer-operated kiosk or other machine, or a network of such machines can convert various forms of consumer currency and other forms of value into a form suitable for paperless electronic commerce from, for example, a smart phone or other wireless mobile device. For example, consumers can use such a kiosk to quickly convert coins and/or cash into "closed loop" virtual gift cards that can be activated, reloaded with funds, used to make purchases with a mobile commerce platform, and/or e-mailed or otherwise sent to someone else, all directly from the consumer's mobile computing device, such as their smart phone.

In various embodiments, the consumer can receive incentives for converting their currency and other funds to virtual gift cards via their mobile device. For example, if a consumer transfers a preset amount, such as $20, to a virtual gift card for use at a restaurant chain, the user could receive a discount on their next purchase as a result of opening their new card. Consumers can also transfer their funds easily and quickly into an "open loop" mobile account (similar to, for example, Google Wallet, ISIS™, etc.) on their mobile device that can be easily scanned, tapped, or otherwise implemented at any retailer equipped with the necessary NFC technology, mobile commerce software, and/or other mobile payment technology solutions necessary to perform such transactions.

In other embodiments, consumers that have closed loop virtual gift cards and/or mobile accounts on their mobile device can automatically receive digital coupons and/or offers via their mobile device. For example, consumers that convert their coin to retailer cards for use with consumer packaged goods (CPG) retailers (e.g., grocery merchants) can automatically receive digital CPG coupons via their mobile device. Such coupons can then be automatically applied to selected items when the consumer uses the virtual gift card or mobile account to pay for the items at checkout. In some embodiments, the consumers can automatically receive the digital coupons from the kiosk when they convert their funds to a virtual gift card. In other embodiments, the retailer or retailers associated with a virtual gift card can send coupons, offers, etc. directly to the consumer's mobile device/mobile account to encourage the consumer to use the virtual gift card at the retailer, to transfer additional funds to the card, and/or for other reasons.

In still further embodiments, consumers can top off their existing mobile wallets or virtual gift card accounts using coins, cash and/or other funds deposited in a wirelessly-enabled kiosk, such as the kiosk 100 described in detail above. In still other embodiments, aspects of the various systems and methods described above can be reversed. In such embodiments, for example, a consumer can wirelessly transfer funds from their mobile wallet, virtual gift card, and/or other accounts on their mobile device to a kiosk, for depositing into a different type of account or for converting into another form of monetary value, such as a redeemable cash voucher or a prepaid card.

Aspects of the invention described in detail above can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted. The various aspects of the invention described herein can be implemented in or for any e-mail environment.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system for transferring funds to a mobile commerce account, the system comprising:
   a consumer-operated kiosk, wherein the consumer-operated kiosk includes—
      a funds receiving portion configured to receive funds from a user;
      a funds counting portion configured to count the funds received from the user to determine a value;
      memory storing one or more display pages configured to receive information from the user to facilitate transferring at least a portion of the value to one or more mobile commerce accounts usable via a mobile device of the user;
      a display configured to display the one or more display pages;
      a user interface configured to receive input from the user in response to the display pages, wherein the input includes: identification information associated with the user, mobile commerce account information, and/or transfer value information; and
      at least one communication device configured to exchange information with one or more processing devices separate from the kiosk; and
   at least one remote computer configured to receive information from the at least one communication device, wherein the information is associated with the input received from the user, and wherein the at least one remote computer is configured to respond to the information by facilitating transfer of the portion of the value to the one or more mobile commerce accounts,
   wherein, in response to the transfer of the portion of the value to the one or more mobile commerce accounts, the mobile device is configured to display a plurality of transaction options that can be executed by the mobile device, wherein the plurality of transaction options include at least two of transferring all or part of the portion of the value to a bank account, transferring all or part of the portion of the value to a loyalty program, transferring all or part of the portion of the value to a virtual gift card, or transferring all or part of the portion of the value to a mobile wallet.

2. The system of claim 1 wherein the funds receiving portion is configured to receive paper currency from the user.

3. The system of claim 1 wherein the funds receiving portion is configured to receive coins from the user.

4. The system of claim 1:
wherein the one or more display pages include a request for contact information,
wherein the user interface is configured to receive the contact information from the user in response to the request,
wherein the at least one remote computer is configured to receive the contact information from the at least one communication device,
wherein the remote computer is configured to send a message to the user via the contact information, and
wherein the message is configured to confirm that the portion of funds have been transferred to the one or more mobile commerce accounts.

5. The system of claim 1:
wherein the one or more display pages include a request for a telephone number associated with the mobile device of the user,
wherein the user interface is configured to receive the telephone number from the user in response to the request,
wherein the at least one remote computer is configured to receive the telephone number from the at least one communication device,
wherein the remote computer is configured to send a message to the mobile device of the user via the telephone number, and
wherein the message is configured to confirm that the portion of funds have been transferred to the one or more mobile commerce accounts.

6. The system of claim 1:
wherein the one or more display pages include a request for an email address of the user,
wherein the user interface is configured to receive the email address from the user in response to the request,
wherein the at least one remote computer is configured to receive the email address from the at least one communication device,
wherein the remote computer is configured to send a message to the email address of the user, and
wherein the message is configured to confirm that the portion of funds have been transferred to the one or more mobile commerce accounts.

7. The system of claim 1 wherein the at least one communication device includes a wireless transceiver configured to send information to the mobile device of the user positioned in the proximity of the kiosk, wherein the information causes the mobile device to display a message to the user confirming that the portion of the value has been transferred to the one or more mobile commerce accounts.

8. The system of claim 1:
wherein the one or more display pages include a request for contact information,
wherein the user interface is configured to receive the contact information from the user in response to the request,
wherein the at least one communication device is configured to send an electronic message to the user via the contact information, and
wherein the message is configured to confirm that the portion of funds have been transferred to the one or more mobile commerce accounts.

9. The system of claim 1:
wherein the one or more display pages include a request for a telephone number associated with the mobile device of the user,
wherein the user interface is configured to receive telephone number from the user in response to the request,
wherein the at least one communication device includes a wireless transceiver configured to send a wireless message to the mobile device of the user via the telephone number, and
wherein the message is configured to confirm that the portion of funds have been transferred to the one or more mobile commerce accounts.

10. The system of claim 1:
wherein the one or more display pages include a request for contact information,
wherein the user interface is configured to receive the contact information from the user in response to the request,
wherein the at least one remote computer is configured to receive amount information from the at least one communication device, the amount information defining the portion of the value to be transferred to the one or more mobile commerce accounts,
wherein the remote computer is further configured to send a message to the kiosk at least partially in response to receiving the amount information, the message confirming that the amount has been transferred to the one or more mobile commerce accounts, and
wherein the at least one communication device is configured to send a message to the user via the contact information in response to receiving the message from the remote computer, the message confirming that the amount has been transferred to the one or more mobile commerce accounts.

11. A method for transferring funds to a mobile commerce account, the method comprising:
receiving funds from a user at a consumer-operated kiosk having a user interface;
counting the funds at the kiosk to determine a value;
receiving a selection from the user via the user interface of the kiosk, wherein the selection is associated with a mobile commerce account usable via a mobile device of the user;
in response to receiving the selection, sending information from the kiosk to a remote computer, wherein the information causes the remote computer to add at least a portion of the value to an amount of funds available to the user via the mobile commerce account; and
in response to the remote computer adding the portion of the value to the mobile commerce account, causing the mobile device to display a plurality of transaction options that can be executed by the mobile device, wherein the plurality of transaction options include at least two of transferring all or part of the portion of the value to a bank account, transferring all or part of the portion of the value to a loyalty program, transferring all or part of the portion of the value to a virtual gift card, or transferring all or part of the portion of the value to a mobile wallet.

12. The method of claim 11 wherein receiving funds from the user includes receiving paper currency from the user.

13. The method of claim 11 wherein receiving funds from the user includes receiving a plurality of coins from the user.

14. The method of claim 11 wherein sending the information from the kiosk includes sending first information, and wherein the method further comprises:
receiving, at the kiosk, confirmation from the remote computer that the portion of the value has been added to the mobile commerce account; and in response to receiving the confirmation, wirelessly sending second information from the kiosk to the mobile device of the user, wherein the second information indicates that the amount of funds available to the user via the mobile commerce account has been increased by the portion of the value.

15. The method of claim 11, wherein sending the information from the kiosk includes sending first information, and wherein the method further comprises:

after receiving the selection from the user, receiving a telephone number from the user via the user interface;

after sending the first information from the kiosk to the remote computer, receiving, at the kiosk, confirmation from the remote computer that the portion of the value has been added to the mobile commerce account; and in response to receiving the confirmation, wirelessly sending second information from the kiosk to the telephone number, wherein the second information indicates that the amount of funds available to the user via the mobile commerce account has been increased by the portion of the value.

16. The method of claim 11, wherein sending the information from the kiosk includes sending first information, and wherein the method further comprises:

after receiving the selection from the user, receiving an email address from the user via the user interface;

after sending the first information from the kiosk to the remote computer, receiving, at the kiosk, confirmation from the remote computer that the portion of the value has been added to the mobile commerce account; and in response to receiving the confirmation, wirelessly sending second information from the kiosk to the email address, wherein the second information indicates that the amount of funds available to the user via the mobile commerce account has been increased by the portion of the value.

17. The method of claim 11, wherein sending the information from the kiosk includes sending first information, and wherein the method further comprises:

after receiving the selection from the user, displaying, via the user interface, a first message instructing the user to provide a telephone number associated with the mobile device;

in response to displaying the first message, receiving a telephone number from the user via the user interface;

after sending the first information from the kiosk to the remote computer, receiving, at the kiosk, confirmation from the remote computer that the portion of the value has been added to the mobile commerce account; and wirelessly sending second information from the kiosk to the mobile device via the telephone number, wherein the second information indicates that the amount of funds available to the user via the mobile commerce account has been increased by the portion of the value.

18. The method of claim 11 wherein sending the information from the kiosk includes sending first information, and wherein the method further comprises:

receiving, at the kiosk, confirmation from the remote computer that the portion of the value has been added to the mobile commerce account; and in response to receiving the confirmation, wirelessly sending second information from the kiosk to the mobile device of the user;

wherein, at least partially in response to receiving the second information, the mobile device displays a message to the user indicating that the amount of funds available to the user via the mobile commerce account has been increased by the portion of the value, and wherein, after displaying the message, the mobile device displays the plurality of transaction options to the user.

* * * * *

UNITED STATES PATENT AND TRADEMARK OFFICE
CERTIFICATE OF CORRECTION

PATENT NO. : 11,100,744 B2
APPLICATION NO. : 16/688984
DATED : August 24, 2021
INVENTOR(S) : Gregory Yahn et al.

Page 1 of 1

It is certified that error appears in the above-identified patent and that said Letters Patent is hereby corrected as shown below:

On the Title Page

On Page 2, Column 2 (item (56) Other Publications), Line 7, delete "Winnepeg" and insert -- Winnipeg --, therefor.
On Page 2, Column 2 (item (56) Other Publications), Line 28, delete "http://www3.ncr.com/" and insert -- http://www.ncr.com/ --, therefor.
On Page 2, Column 2 (item (56) Other Publications), Line 36, delete "Selectronic" and insert -- Electronic --, therefor.
On Page 2, Column 2 (item (56) Other Publications), Line 38, delete "Selectronic" and insert -- Electronic --, therefor.

In the Drawings

On Sheet 15 of 17, Fig. 10 (Reference Numeral 1012), Line 3, delete "TRANFER" and insert -- TRANSFER --, therefor.
On Sheet 16 of 17, Fig. 11 (Reference Numeral 1114), Line 3, delete "TRANFER" and insert -- TRANSFER --, therefor.

In the Specification

In Column 1, Line 13 (Approx.), delete "9,766,014," and insert -- 9,799,014, --, therefor.
In Column 1, Line 45, delete "merchandize" and insert -- merchandise --, therefor.
In Column 9, Line 36, delete "780a-780n" and insert -- 780a-780η --, therefor.
In Column 9, Line 48, delete "760n." and insert -- 760η. --, therefor.
In Column 9, Line 49, delete "760n" and insert -- 760η --, therefor.

Signed and Sealed this
First Day of July, 2025

Coke Morgan Stewart
*Acting Director of the United States Patent and Trademark Office*